US008458100B1

(12) United States Patent
Nowak, Jr. et al.

(10) Patent No.: US 8,458,100 B1
(45) Date of Patent: Jun. 4, 2013

(54) METHOD AND SYSTEM FOR MATCHING CIVILIAN EMPLOYERS WITH CANDIDATES HAVING PRIOR MILITARY EXPERIENCE

(75) Inventors: Donald Edward Nowak, Jr., Suwanee, GA (US); Anthony Morris, Kennesaw, GA (US)

(73) Assignee: Bradley-Morris, Inc., Kennesaw, GA (US)

( * ) Notice: Subject to any disclaimer, the term of this patent is extended or adjusted under 35 U.S.C. 154(b) by 649 days.

(21) Appl. No.: 12/565,683

(22) Filed: Sep. 23, 2009

(51) Int. Cl.
*G06Q 10/00* (2006.01)

(52) U.S. Cl.
USPC .......................................................... 705/321

(58) Field of Classification Search
USPC ................................................. 705/320, 321
See application file for complete search history.

(56) References Cited

U.S. PATENT DOCUMENTS

| | | | |
|---|---|---|---|
| 5,164,897 A | 11/1992 | Clark | |
| 5,592,375 A | 1/1997 | Salmon | |
| 6,266,659 B1 * | 7/2001 | Nadkarni | 705/7.14 |
| 6,289,340 B1 * | 9/2001 | Puram et al. | 705/7.14 |
| 7,870,079 B2 * | 1/2011 | McGovern et al. | 705/321 |
| 2001/0042000 A1 | 11/2001 | Defoor | |
| 2002/0055867 A1 * | 5/2002 | Putnam et al. | 705/8 |
| 2006/0265266 A1 | 11/2006 | Chen | |
| 2006/0277056 A1 | 12/2006 | Broberg | |
| 2007/0022188 A1 | 1/2007 | Kohs | |
| 2007/0244734 A1 | 10/2007 | Mcgovern | |
| 2007/0294092 A1 * | 12/2007 | Calannio | 705/1 |
| 2008/0059290 A1 | 3/2008 | Mcfaul | |
| 2008/0071746 A1 | 3/2008 | Concordia | |
| 2008/0091455 A1 | 4/2008 | Dongara | |
| 2008/0133343 A1 | 6/2008 | Hyder | |
| 2008/0140710 A1 | 6/2008 | Dedhia | |
| 2009/0037235 A1 | 2/2009 | Au | |
| 2009/0144248 A1 | 6/2009 | Treadgold | |
| 2010/0131418 A1 * | 5/2010 | Mccagg et al. | 705/321 |
| 2010/0161503 A1 * | 6/2010 | Foster | 705/321 |

OTHER PUBLICATIONS

Poe, Andrea. "I Want You After the U.S. Army." SHRM.org. HR Magazine, Apr. 2001. Web. Feb. 1, 2013.*

* cited by examiner

*Primary Examiner* — Jonathan Ouellette
*Assistant Examiner* — Amanda Kirlin
(74) *Attorney, Agent, or Firm* — Smith Risley; Steven P. Wigmore

(57) ABSTRACT

A computer method for matching civilian employers with candidates having prior military experience can include identifying an employer profile whose desired level of military service matches a level of military service of a candidate profile. The employer profile can be stored in a memory if the desired level military service for the employer profile matches the level of military service for the candidate profile. Remaining military fields in the employer profile stored in the memory can be compared against remaining military fields in the candidate profile. Weight values can be assigned to military fields of the candidate profile based on a degree of matching between the military fields of the employer profile and the candidate profile. The weight values can correspond to a preferred status and a non-preferred status for a respective field desired by an employer.

18 Claims, 20 Drawing Sheets

WEIGHTING SCALE AND EFFECT(S) OF SELECTED PARAMETERS
FOR EMPLOYER PROFILE(S) ON CANDIDATE PROFILE(S)

| FIELDS COMPLETED IN EMPLOYER PROFILE | WEIGHTING OF PARAMETER / IMPACT ON MATCHING |
|---|---|
| A PARAMETER IN AN EMPLOYER FIELD IS LISTED | IF CANDIDATE MATCHES PARAMETER, VALUE OF 1 ASSIGNED TO CORRESPONDING CANDIDATE FIELD; IF CANDIDATE DOES NOT MATCH PARAMETER, VALUE OF 0 IS ASSIGNED TO CORRESPONDING CANDIDATE FIELD |
| A PARAMETER IN AN EMPLOYER FIELD IS MARKED AS "REQUIRED" | CANDIDATES WITHOUT SAME VALUE IN CORRESPONDING FIELD ARE ELIMINATED FROM MATCH |
| A PARAMETER IN AN EMPLOYER FIELD IS MARKED AS "PREFERRED" | IF CANDIDATE MATCHES PARAMETER, VALUE OF 3 ASSIGNED TO CORRESPONDING CANDIDATE FIELD; IF CANDIDATE DOES NOT MATCH PARAMETER, VALUE OF 0 IS ASSIGNED TO CORRESPONDING CANDIDATE FIELD |
| A PARAMETER IN AN EMPLOYER FIELD IS MARKED AS "REQUIRED" AND "PREFERRED" | CANDIDATES WITHOUT SAME VALUE IN CORRESPONDING FIELD ARE ELIMINATED FROM MATCH; CANDIDATES WITH SAME VALUE IN CORRESPONDING FIELD ARE PROVIDED A VALUE OF 3 |

*FIG. 10*

EMPLOYER (BEST FIT) PROFILE MATCHING TABLE — 1100

| FIELDS FROM EMPLOYER PROFILE | VALUE |
|---|---|
| EMPLOYER (BEST FIT) PROFILE GUID | 18979 |
| JOB ORDER GUID | 87654 |
| DIVERSITY FIELD | 1 |
| AUTOMATCH DATE | 09.12.2009 |
| MILITARY EXPERIENCE PREFERRED | 1 |
| AVAILABILITY | 1 |
| MILITARY EXPERIENCE REQUIRED | 1 |
| AVAILABILITY PREFERRED | 0 |
| TOTAL POSSIBLE POINTS | 126 |
| SALARY | 2, 7 |
| RANK | 6, 9 |
| SCHOOL | 7, 3 |
| SECURITY CLEARANCE | 5, 3 |
| ID OF MANAGER WHO SAVED PROFILE | 5678 |
| • | • |
| • | • |
| • | • |

BRANCH SUBTABLE FOR EMPLOYER PROFILE — 1200

| EMPLOYER (BEST FIT) PROFILE GUID | 18979 |
|---|---|
| JOB ORDER GUID | 87654 |
| BRANCH ID | 3, 1 |
| LAST UPDATED | 09.12.2009 |

LOOK UP TABLE FOR ALL TABLES — 1300

| TYPE_ID | ID | DESCRIPTION |
|---|---|---|
| • | • | • |
| • | • | • |
| • | • | • |
| 3 | 1 | AIR FORCE |
| 4 | 1 | NO |
| 4 | 2 | YES |
| 4 | 3 | MAYBE |
| 5 | 1 | TOP SECRET POLY |
| 5 | 2 | TOP SECRET SSB1 |
| 5 | 3 | TOP SECRET |
| 5 | 4 | SECRET |
| 5 | 5 | NO CLEARANCE |
| • | • | • |
| • | • | • |
| • | • | • |

FIG. 13

CANDIDATE PROFILE — 1400

| CANDIDATE GUID | 2344 |
|---|---|
| AA DIVERSITY | 2 |
| GENDER | 2 |
| CLEARANCE | 5, 1 |
| • | • |
| • | • |
| • | • |

JOB ORDER INFO ← 1905

Job Order Number   735

Client              Systems Planning and Analysis, Inc. (SPA)

Job Title           Nuke Submarine Lieutenants

CANDIDATE INFO ← 1910

Name        John Ackerman

Match Pct   55%

METHOD AND SYSTEM FOR MATCHING CIVILIAN EMPLOYERS WITH CANDIDATES HAVING PRIOR MILITARY EXPERIENCE

FIELD OF THE INVENTION

The invention generally relates to computer software for matching employers with job candidates. More particularly, the invention relates to using computer software to match civilian employers with candidates having former military experience.

BACKGROUND

Civilian employers often hire ex-military personnel (candidates) because of the extensive training that the military often provides for its service men and women. For example, civilian nuclear power plant operators can take advantage of military personnel who may have served on nuclear powered submarines and who may be very familiar with running and trouble-shooting nuclear reactors.

However, civilian employers frequently do not understand the terminology used by military personnel to describe their skills received from their military training. This means that civilian employers often cannot determine if a military person has the right tool set for a civilian job based on a resume alone because of the descriptions used in the resume by the military person. The descriptions used by military personnel can be cryptic due to terminology and acronyms specific to military training and military projects.

Software currently exists which can translate terms used by military personnel in their resumes to terms commonly used by employers to describe skills needed in a particular job. Once the military resumes are translated, the translated terms are compared to a pool of civilian employment opportunities which have civilian terminology to describe desired skill sets. One such software package is known as Turbo TAP (Transition Assistance Program). While it is an objective of this software to match military personnel with available civilian employment opportunities, this current software has a very low success rate in matching military personnel with an appropriate civilian employment opportunity.

Accordingly, there is a need in the art for computer software that can bridge the current gap in properly matching civilian employers with former military personnel. Specifically, there is a need in the art for software that can instruct a computer to find highly qualified military personnel who are well suited for a particular employer that may have unique employment requirements. There is a further need in the art for computer software that can provide a quantitative measure of correlations between civilian employers and job candidates or applicants who have military experience.

SUMMARY

According to one exemplary aspect, a computer method for matching civilian employers with candidates having prior military experience can comprise identifying an employer profile whose desired level of military service matches a level of military service of a candidate profile. The employer profile can be stored in a memory if the desired level military service for the employer profile matches the level of military service for the candidate profile. Remaining military fields in the employer profile stored in the memory can be compared against remaining military fields in the candidate profile. Weight values can be assigned to military fields of the candidate profile based on a degree of matching between the military fields of the employer profile and the candidate profile.

According to another exemplary aspect, a computer method for matching civilian employers with candidates having prior military experience can comprise identifying a candidate profile whose level of military service matches a desired level of military service of an employer profile. The candidate profile can be stored in a memory if the candidate profile's level of military service matches the desired level of military service of the employer profile. Remaining military fields in the candidate profile can be compared against remaining military fields in the employer profile. Weight values can be assigned to military fields of the candidate profile based on a degree of matching between the military fields of the employer profile and the candidate profile.

According to another exemplary aspect, a computer system for matching civilian employers with candidates having prior military experience can comprise a processing unit; a memory storage device; a display device coupled to the processing unit for displaying data; and a program module for providing instructions to the processing unit. The processing unit can be responsive to the instructions of the program module and it may be operable for identifying a plurality of candidate profiles whose level of military service matches a desired level of military service of an employer profile. A candidate profile can be stored in the memory storage device if the candidate profile whose level of military service matches the desired level of military service of the employer profile. A first weight value can be assigned to a matched military field of a candidate profile if a status of the military field in a corresponding employer profile is preferred. A second weight value can be assigned to a matched military field of a candidate profile if a status of the military field in the corresponding employer profile is not preferred.

According to another exemplary aspect, a computer method for matching civilian employers with candidates having prior military experience can be provided with a two-tier level of review. This two-tier level of review can comprise prompting a first level reviewer for entering and reviewing employer profile data at a first instance. Subsequently, a second level reviewer can be prompted to review and update employer profile data that was created by the first level reviewer.

BRIEF DESCRIPTION OF THE DRAWINGS

FIG. 3 is an exemplary computer display of a user interface which collects candidate information according to an exemplary embodiment of the invention.

FIG. 4 is an exemplary computer display of a user interface which collects employer information according to an exemplary embodiment of the invention.

FIG. 5 is an exemplary computer display of a user interface which displays and allows edits and updates to candidate profile information according to an exemplary embodiment of the invention.

FIG. 10 is an exemplary table which lists a weighting scale and the effects of selected parameters for employer profiles on candidate profiles according to an exemplary embodiment of the invention.

FIG. 11 is an exemplary table that can be stored in memory, such as in the database of FIG. 1, and which lists the parameters that may be tracked for an employer profile according to an exemplary embodiment of the invention.

FIG. 12 is an exemplary sub-table that can be stored in memory, such as in the database of FIG. 1, and which lists exemplary parameters that may be tracked for a particular field of an employer profile according to an exemplary embodiment of the invention.

FIG. 13 is an exemplary look-up table that can be stored in memory, such as in the database of FIG. 1, and which lists exemplary parameters that comprise numbers and/or alpha numeric text which are translations or short-hand for values and fields used in candidate profiles and employer profiles according to one exemplary embodiment of the invention.

FIG. 14 is an exemplary table that can be stored in memory, such as in the database of FIG. 1, and which lists the translated values for the fields within a candidate profile according to one exemplary embodiment of the invention.

FIG. 17 is an exemplary computer display of a user interface which displays results of an employer profile match according to an exemplary embodiment of the invention.

FIG. 19 illustrates exemplary contents of an e-mail generated for a candidate profile match that can be sent to an employer representative according to an exemplary embodiment of the invention.

FIG. 21 is an exemplary computer display of a candidate profile which displays the employer profiles matched to the candidate according to an exemplary embodiment of the invention.

FIG. 22 is an exemplary computer display of a candidate profile which displays the employer profiles in which the candidate has submitted an application and/or resume according to an exemplary embodiment of the invention.

DETAILED DESCRIPTION

Opposite to conventional technology which translates military resumes into terms used to describe desired skills in civilian employment opportunities, a method and system has been developed to translate civilian desired skills into military terminology so that these translated civilian terms are used in a comparison against a pool of military resumes. The method and system provides an algorithm which allows certain skills and employment factors to be weighted. For example, an employer may be seeking a candidate who will work in a specific geographic location, like San Antonio, Tex. and who has specific computer skills and certifications. The algorithm of the invention, according to one exemplary aspect, allows these elements to be weighted differently depending upon their relative importance to the employer.

So, in this example, the geographic location of San Antonio can be assigned a first weight value while the certifications and computer skills can be assigned second and third weight values which are greater in magnitude relative to the first value. These values create a filter which may be applied to the pool of military resumes. Each military resume may be filtered and scored based on the total of these values applied to a particular resume. The result of the scoring may provide a matched candidate listing which enumerates a number of candidates having certain scores. For example, the matched candidate listing could enumerate three resumes which have a 100% match based on the weighted factors, as well five resumes with a 70% match based on the weighted factors. This matched candidate listing will likely provide the civilian employer with candidates who are most suitable for the civilian employment opportunity which was translated for comparison against the military resumes.

Figure 1:
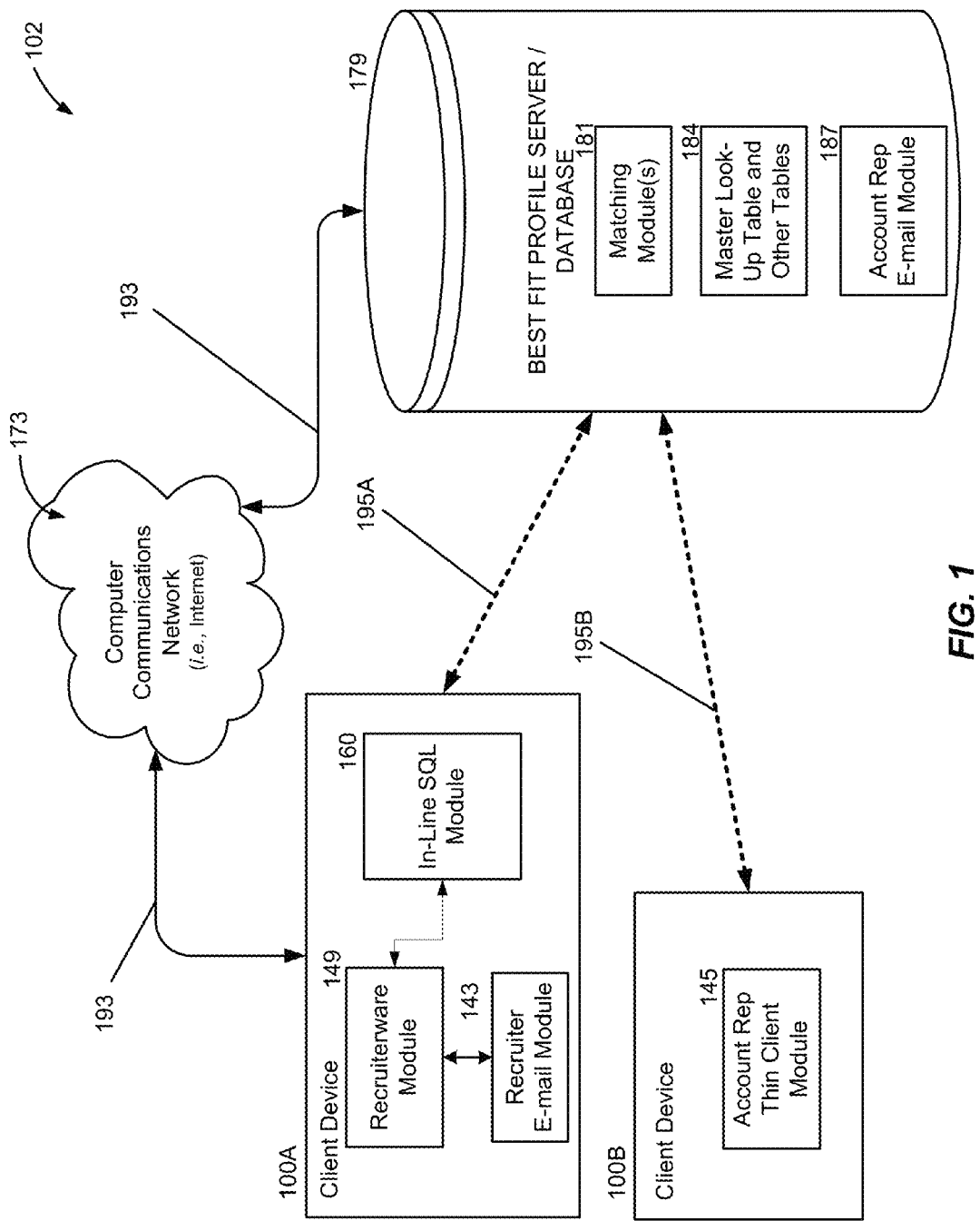
FIG. 1 is a functional block diagram of a computer system for matching civilian employers with candidates having prior military experience according to an exemplary embodiment of the invention.

Referring now to the drawings, in which like reference numerals denote like elements, FIG. 1 is a functional block diagram of a computer system 102 for matching civilian employers with candidates having prior military experience according to an exemplary embodiment of the invention. The computer system 102 can comprise a server 179 which can be coupled to a network 173 that can comprise a wide area network ("WAN"), a local area network ("LAN"), the Internet, or a combination of networks. The server 179 can also comprise a database which can store various records related to candidates and employer profiles.

The server 179 can comprise any type of computer server. According to one exemplary embodiment, the server 179 can comprise a MySQL server. However, other types of servers and server applications are not beyond the scope of the invention. For example, the server 179 can comprise a Linux based operating system and can process pages processed by the Ruby on Rails framework. Meanwhile, exemplary server application specifications, include, but are not limited to the following: RedHat Enterprise Linux 5; Apache 2.2; Ruby 1.8; and Ruby On Rails 2.3.3. Other hardware and software for the server 179 and its respective databases, other than those described, are not beyond the scope of the invention.

The server 179 can be coupled to the network 173 via a communication link 193. Through the network 173, the server 179 can communicate with various different client devices 100A,B that can include desktop or laptop computers and other devices.

Each client device 100A,B can run or execute various software 145, 149 in order to access the server 179 and its various applications, such as its matching modules 181. The client devices 100A,B can take on many different forms such as desktop computers, laptop computers, handheld devices such as personal digital assistants ("PDAs"), in addition to other smart devices, such as cellular telephones. Any device which can access the network 173 can be a client computer device 100A,B according to the computer system 102. The client devices 100A,B can be coupled to the network 173 by various types of communication links 193. These communication links 193 can comprise wired as well as wireless links. The communication links 193 allow each of the client devices 100A,B to establish virtual links 195 with the server 179.

Figure 2:
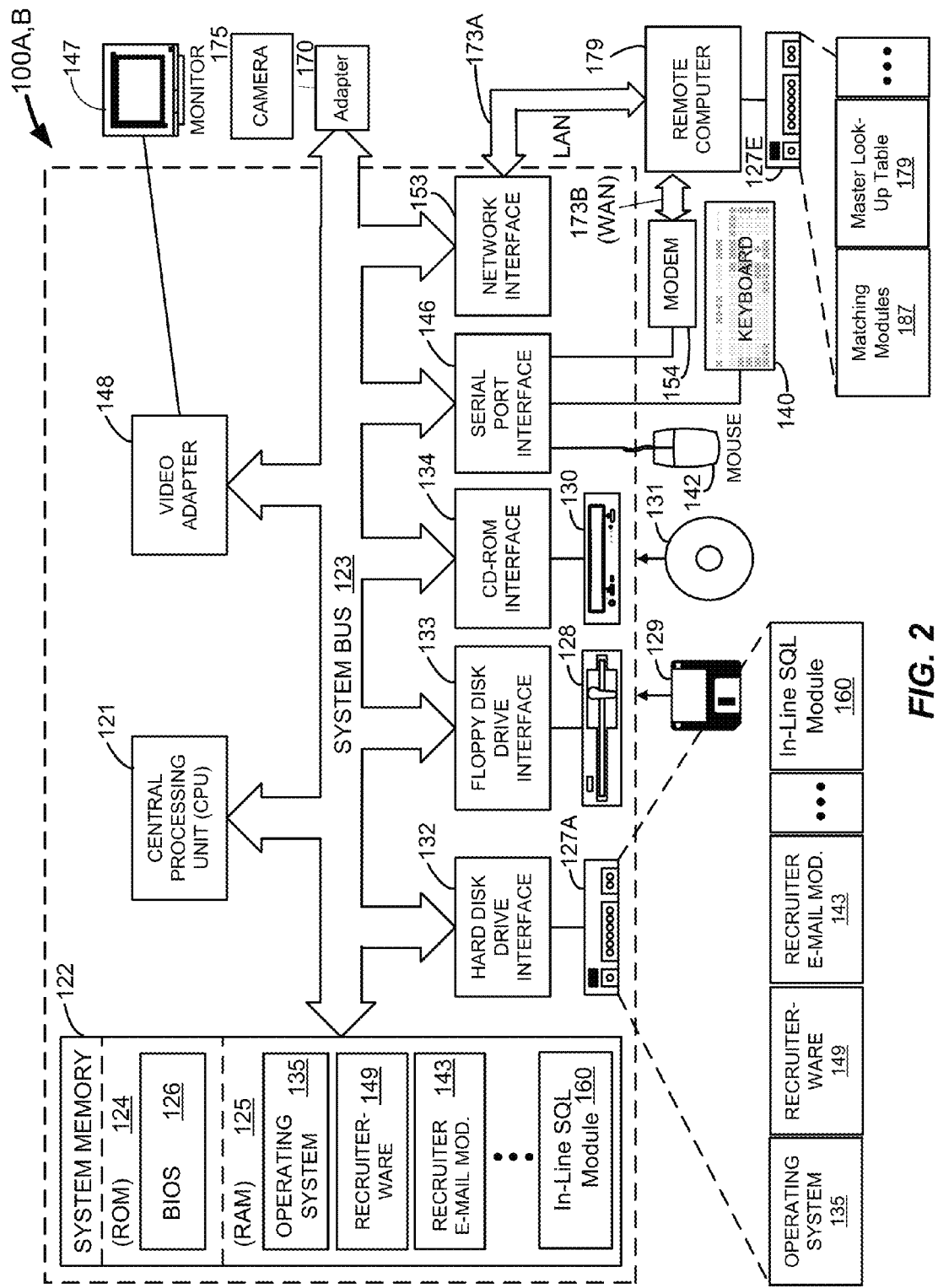
FIG. 2 is a functional block diagram of a computer that can be used in the system for matching civilian employers with candidates having prior military experience according to an exemplary embodiment of the invention.

Each client device 100A,B preferably comprises a display 147 and a camera 175 (See FIG. 2). The display 147 can comprise any type of display device such as a liquid crystal display (LCD), a plasma display, an organic light-emitting diode (OLED) display, and a cathode ray tube (CRT) display. The camera can comprise a video camera such as a webcam. The camera 175 can be a CCD (charge-coupled device) camera or a CMOS (complementary metal-oxide-semiconductor) camera.

The client devices 100A,B can execute or run the recruiterware module 149 and the account representative module 145. The recruiterware module 149 can provide a graphical user interface 300 for collecting candidate data based on a resume or telephone interview with a candidate, such as the one illustrated in FIG. 3 and which is discussed below. The recruiterware module 149 can also help generate the candidate profile user interfaces illustrated in FIGS. 5 and 6, described below.

The recruiterware module 149 can be coupled to the recruiter e-mail module 143. The recruiter e-mail module 143 can be responsible for generating the e-mails containing the matched employer profiles associated with particular candidates, such as the e-mails illustrated in FIG. 20 and described below. The recruiterware module 149 can also be coupled to an in-line SQL module 160 that can help translate commands between the recruiterware module 149 and the server 179. Specifically, according to one exemplary embodiment, the in-line SQL module 160 can produce ActiveX data objects which can be COM objects that are handled by the database 179.

Figures 3, 4:
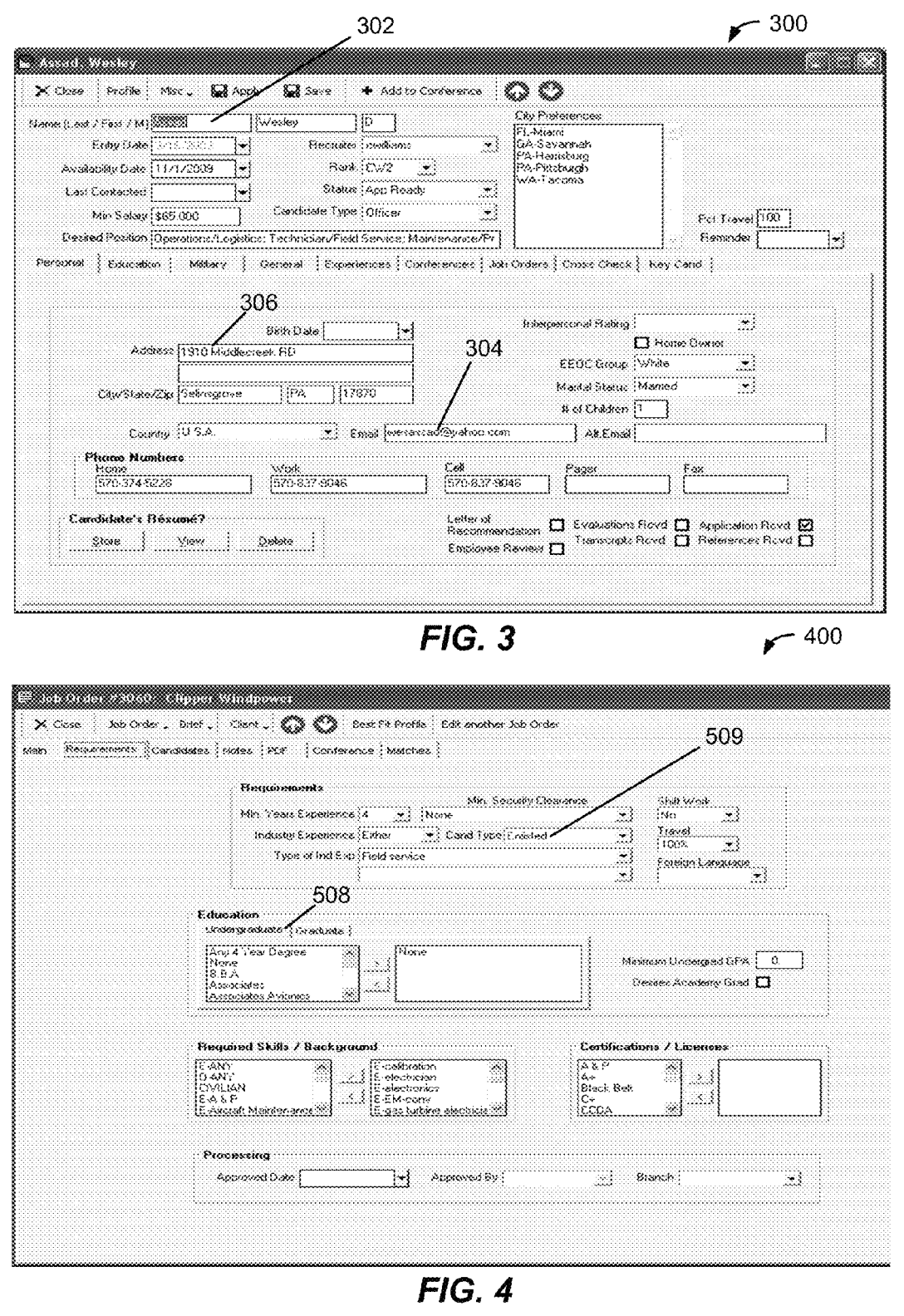
Figure 7:
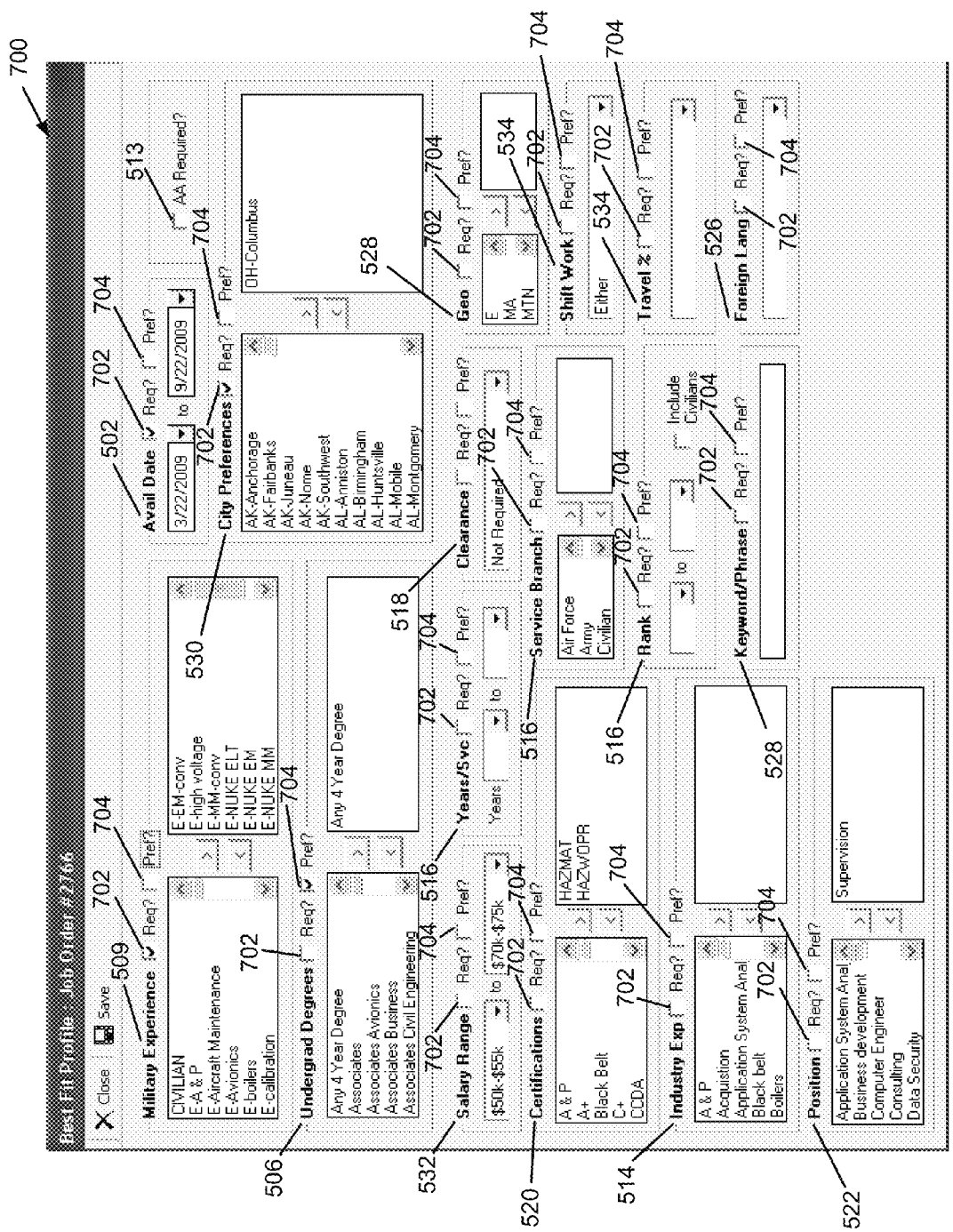
FIG. 7 is an exemplary computer display of a user interface which displays and allows updates to employer profile information according to an exemplary embodiment of the invention.

The account rep client module 145 of the client device 100B can provide various displays and collect various employer information such as illustrated in FIGS. 4 and 7 described below. The server 179 can also run or execute various modules 181, 184, and 187. For example, the server 179 can execute various matching modules 181 that are responsible for matching employer profiles with candidate profiles based on certain algorithms described in fuller detail below. The server 179 can also support a master look-up table in other tables and sub-tables 184. The server 179 can also support an account rep e-mail module 187 that produces the e-mails for employer representatives when a match exists between employer profiles in candidate profiles.

FIG. 2 is a functional block diagram of a computer 100A,B that can be used in the system 102 for matching civilian employers with candidates having prior military experience according to an exemplary embodiment of the invention. The exemplary operating environment for the system 102 includes a general-purpose computing device in the form of a conventional computer. Generally, the client device 100A includes a processing unit 121, a system memory 122, and a system bus 123 that couples various system components including the system memory 122 to the processing unit 121.

The system bus 123 may be any of several types of bus structures including a memory bus or memory controller, a peripheral bus, and a local bus using any of a variety of bus architectures. The system memory includes a read-only memory (ROM) 124 and a random access memory (RAM) 125. A basic input/output system (BIOS) 126, containing the basic routines that help to transfer information between elements within computer 100, such as during start-up, is stored in ROM 124.

The client device 100A,B which may be a computer, can include a hard disk drive 127A for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127A, magnetic disk drive 128, and optical disk drive 130 are connected to system bus 123 by a hard disk drive interface 132, a floppy disk drive interface 133, and an optical disk drive interface 134, respectively.

Although the exemplary environment described herein employs a hard disk drive 127A, removable magnetic disk 129, and removable optical disk 131, it should be appreciated by those skilled in the art that other types of computer readable media which can store data that is accessible by a computer 100, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in smaller client devices 100A such as in cellular phones and/or personal digital assistants (PDAs). The drives and their associated computer readable media illustrated in FIG. 2 provide nonvolatile storage of computer-executable instructions, data structures, program modules, and other data for computer or client device 100A, B.

A number of program modules may be stored on hard disk 127, magnetic disk 129, optical disk 131, ROM 124, or RAM 125, including an operating system 135, the recruiterware module 149, a recruiter e-mail module 143, and an In-Line SQL module 160. Program modules include routines, subroutines, programs, objects, components, data structures, etc., which perform particular tasks or implement particular abstract data types. Aspects of the present invention may be implemented in the form of the recruiterware module 143 or account rep module 145 which are executed by the client device 100A,B in order to provide a method and system for matching civilian employers with candidates having prior military experience.

A user may enter commands and information into computer 100A,B through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), or the like.

The display 147 may also be connected to system bus 123 via an interface, such as a video adapter 148. As noted above, the display 147 can comprise any type of display devices such as a liquid crystal display (LCD), a plasma display, an organic light-emitting diode (OLED) display, and a cathode ray tube (CRT) display.

The camera 175 may also be connected to system bus 123 via an interface, such as an adapter 170. As noted previously, the camera 175 can comprise a video camera such as a webcam. The camera 175 can be a CCD (charge-coupled device) camera or a CMOS (complementary metal-oxide-semiconductor) camera. In addition to the monitor 147 and camera 175, the client device 100A,B comprising a computer, may include other peripheral output devices (not shown), such as speakers and printers.

The client device 100A,B comprising a computer, may operate in a networked environment using logical connections to one or more remote computers, such as the server 179. A remote computer 179 may be another personal computer, a server, a client, a router, a network PC, a peer device, or other common network node. While the server 179 or a remote computer typically includes many or all of the elements described above relative to the client device 100A, only a memory storage device 127E has been illustrated in FIG. 2. The logical connections depicted in FIG. 2 include a local area network (LAN) 173A and a wide area network (WAN) 173B. Such networking environments are commonplace in offices, enterprise-wide computer networks, intranets, and the Internet.

When used in a LAN networking environment, the client device 100A,B comprising a computer 100, is often connected to the local area network 173A through a network interface or adapter 153. When used in a WAN networking environment, the client device 100A, comprising a computer 100, typically includes a modem 154 or other means for establishing communications over WAN 173B, such as the Internet. Modem 154, which may be internal or external, is connected to system bus 123 via serial port interface 146. In a networked environment, program modules depicted relative to the server 179, or portions thereof, may be stored in the remote memory storage device 127E. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, network personal computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

FIG. 3 is an exemplary computer display 300 of a user interface which collects candidate information according to an exemplary embodiment of the invention. With this user interface, a recruiter may collect various information about an employment candidate. This user interface may comprise several data fields that are organized such that they are easily completed by a recruiter who may collect this information during a phone interview with the candidate or by reviewing the resume of a candidate. For example, various fields such as a name field 302, an e-mail field 304, and a home phone number field 306 may be in a predetermined alignment so that it is easy for the recruiter to key-in this data during the circumstances described above.

FIG. 4 is an exemplary computer display 400 of a user interface which collects employer information according to an exemplary embodiment of the invention. With this user interface, an employer representative may collect various information about an employer. This user interface may comprise several data fields that are organized such that they are easily completed by an employer representative who may collect this information during a phone interview with the employer or by reviewing a hard copy of a list of job requirements provided by the employer. For example, various fields such as a military experience field 504, and an undergraduate degree field 508 may be in a predetermined alignment so that it is easy for the employer representative to key-in this data during the circumstances described above.

Figure 5:
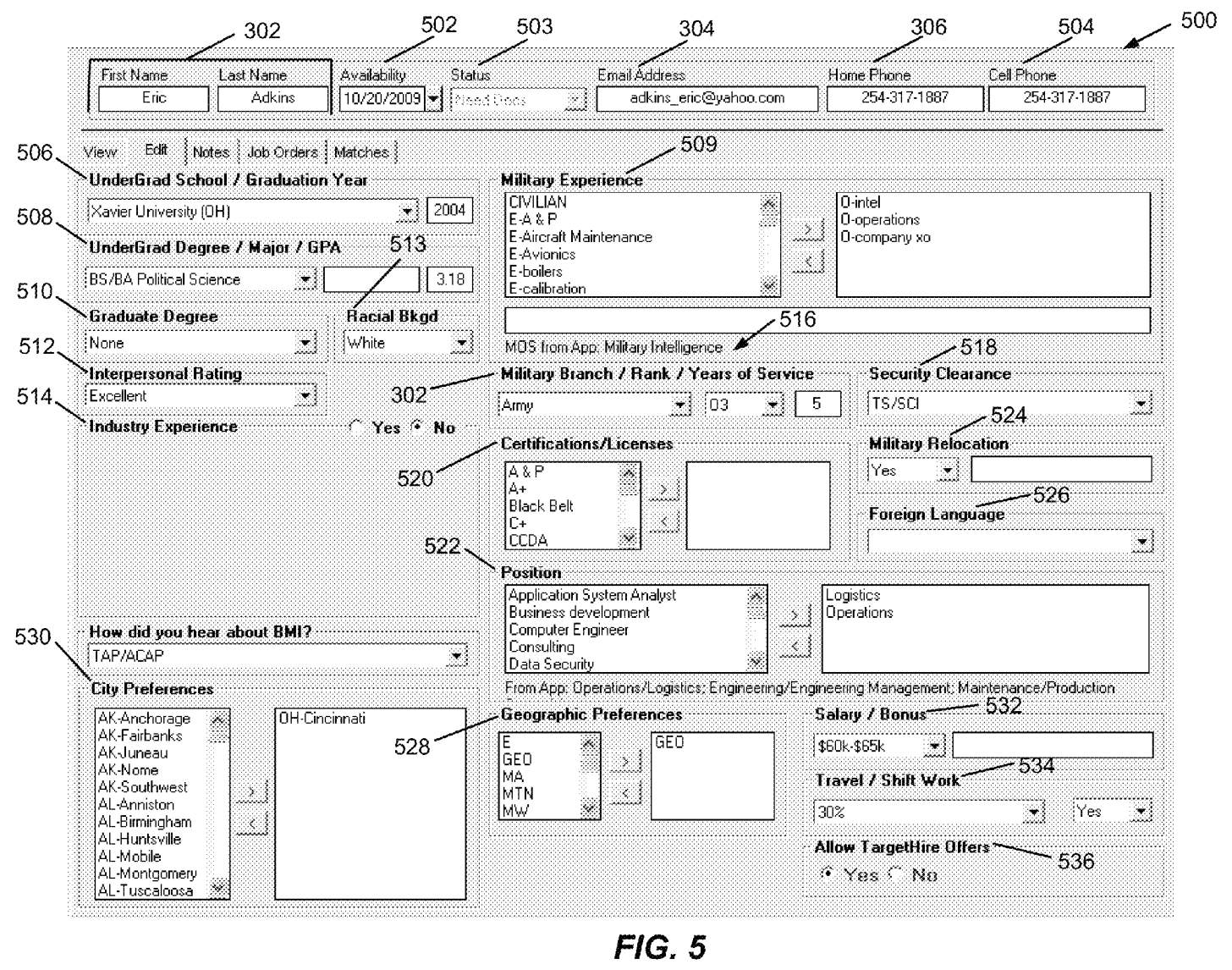

FIG. 5 is an exemplary computer display 500 of a user interface which displays and allows edits and updates to candidate profile information according to an exemplary embodiment of the invention. This exemplary user interface can be presented to a recruiter on a client device 100A after the recruiter has completed the candidate information collection screens as illustrated in the user interface of FIG. 3. The recruiterware module 149 can pre-populate the candidate profile of FIG. 5 by extracting the data collected from the user interface of FIG. 3. The candidate profile of FIG. 5 can display various fields of data that can be modified or edited by the user.

Specifically, the candidate profile of FIG. 5 is designed so that the recruiter can easily make changes and/or provide additional information about a particular candidate based on the fields listed in the profile. Some of the fields can be equipped with drop-down menus so that any data entered by the recruiter is consistent with other recruiters who may be filling out profiles of other candidates.

The various fields of the candidate profile of FIG. 5, include but are not limited to, the following: name fields 302, candidate availability 502, need docs or applicant status field 503, e-mail address 304, home phone 306, cell phone 504, undergraduate school/graduation year 506, undergraduate degree/major/GPA 508, military experience 509, graduate degree 510, diversity data 513, interpersonal rating 512, industry experience 514, military branch/rank/years of service 516, security clearance 518, certifications/licenses 520, position 522, military relocation 524, foreign language 526, geographic preferences 528, city preferences 530, salary/bonus by 532, travel/shiftwork 534, and allow target hire offers 536.

A simple list of the exemplary fields of candidate data that can be tracked by the invention is provided in Table 1 below:

TABLE 1

LIST OF EXEMPLARY FIELDS FOR CANDIDATE DATA

| A. | Undergraduate School | B. | Military Rank |
|---|---|---|---|
| C. | Undergraduate Degree | D. | Military Years of Service |
| E. | Undergraduate Major | F. | Military MOS |
| G. | Undergraduate GPA | H. | Security Clearances held |
| I. | Undergraduate Graduation Year | J. | Certifications or Licenses held |
| K. | Graduate Degree | L. | Foreign Languages spoken |
| M. | Diversity Data | N. | Job Titles they would like to apply for |
| O. | Interpersonal Rating | P. | Geo-Region Preferences |
| Q. | Industry Experience | R. | Salary Requirements |
| S. | City Preferences | T. | Salary Bonuses desired |
| U. | Military Experience | V. | Shift Work (Yes or No) |
| W. | Military Branch of Service | X. | Travel Percentage (what percentage of time they are willing to travel) |

Other fields of candidate data may exist and which could be tracked by the invention. In other words, the invention is not limited to the fields of candidate data listed in Table 1 above.

As one example of a data field that provides a drop-down menu in the user interface of the computer display 500, the undergraduate school/graduation year field 506 provides a drop-down menu of options that can be selected by the recruiter for this field 506. Similarly, the military experience field 509 provides a list of options that can be scrolled through with a pointer device and then selected by the recruiter. The invention is not limited to the specific mechanisms for selecting values for the various fields of candidate data shown. That is, other mechanisms for selecting values can be employed without departing from the invention. For example, instead of using a scrollable list to present options for selecting values in the military experience field 509, a drop-down menu could be employed and would be within the scope of the invention.

Figure 6:
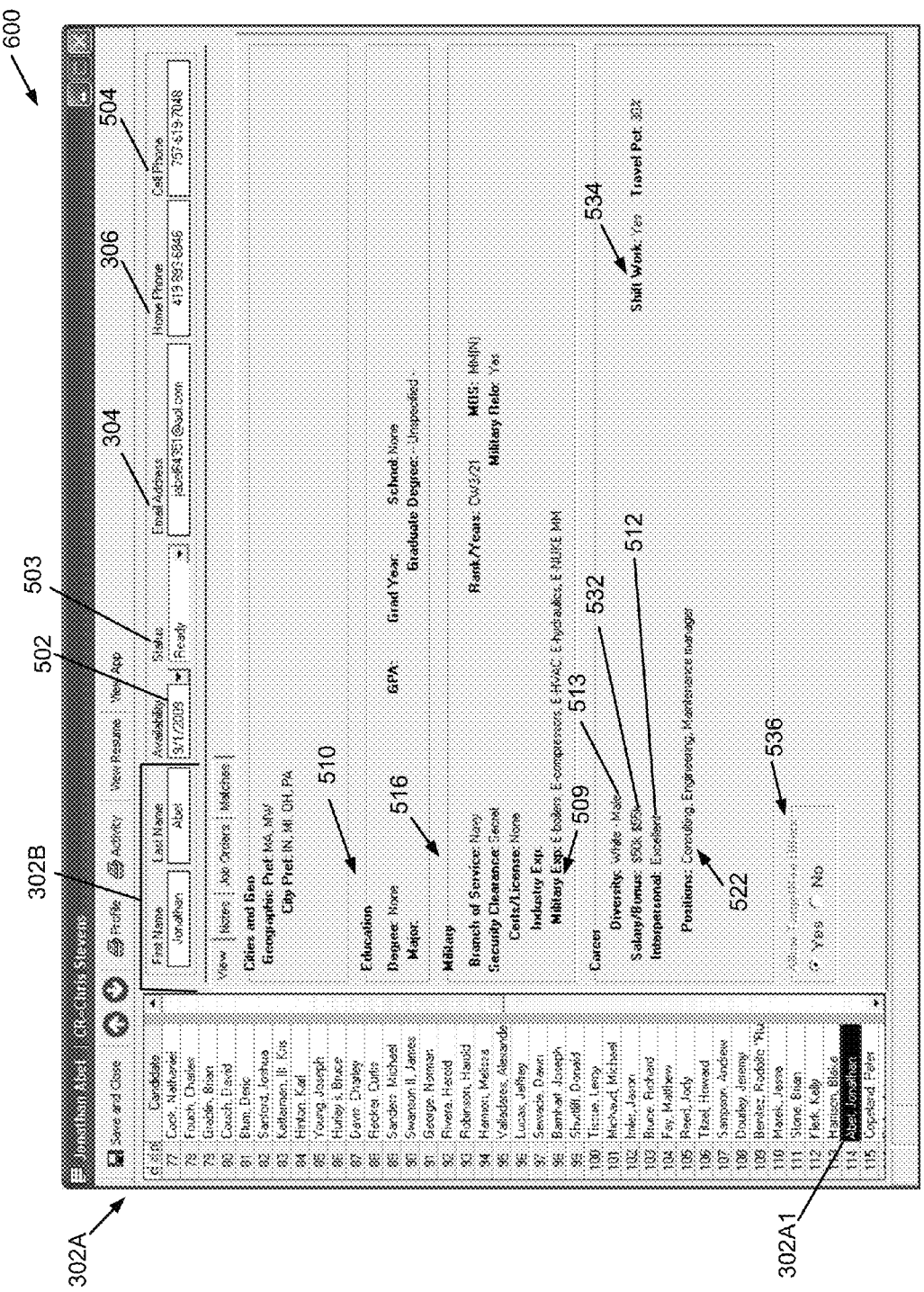
FIG. 6 is an exemplary computer display of a user interface which displays candidate profile information according to an exemplary embodiment of the invention.

FIG. 6 is an exemplary computer display 600 of a user interface which displays candidate profile information according to an exemplary embodiment of the invention. This computer display 600 generally corresponds with the candidate profile edit display 500 of FIG. 5. This user interface allows the recruiter to view the candidate data in a simple format. Most of the fields in this user interface cannot be changed or edited by the recruiter.

The display 600 can provide a list 302A of names of candidates that can be scrolled through by the recruiter. When a name 302A1 is selected by the recruiter from the list 302A, the data corresponding to the selected name 302A1 is displayed on the right-hand side of the list 302A. The invention is not limited to the scrollable list 302A. Other ways of displaying the candidate profile information are within the scope of the invention.

FIG. 7 is an exemplary computer display 700 of a user interface which displays and allows updates to employer profile information according to an exemplary embodiment of the invention. The user interface of computer display 700 is very similar to the user interface of the computer display 500. Specifically, the user interface of the computer display 700 also allows an employer representative to select values from drop-down menus and scrollable lists for various fields of employer data, similar to how the values for the fields of candidate data are selected in FIG. 5. Further, most of the fields of data provided in the user interface of the computer display 700 are pre-populated based on the employer data collection user interface of the computer display 400 illustrated in FIG. 4.

While the user interface of the computer display 700 is used to track employer data instead of candidate data, the fields of employer data generally correspond to the fields of candidate data so that matching between groups of employers and groups of candidates can be made.

As noted above, many similarities between the employer profile of the computer display 700 of FIG. 7 and the candidate profile of the computer display 500 of FIG. 5 exist. But there are some differences between these two profile user interfaces. One main difference is that the employer profile of the computer display 700 provides additional data that can be tracked by the system 102.

Some of the additional data includes the "required" field 702 and the "preferred" field 704. These fields 702, 704 allow an employer representative to specify the relative importance or weighting of certain employer data which can be used to filter out or rank candidates. The required field 702 and the preferred field 704 are options that are generally provided for each field of employer data which is tracked by the invention. A further description of how the required field 702 and the preferred field 704 for employer data can impact the weighting of corresponding candidate data is provided below in connection with FIG. 10.

Figure 8:
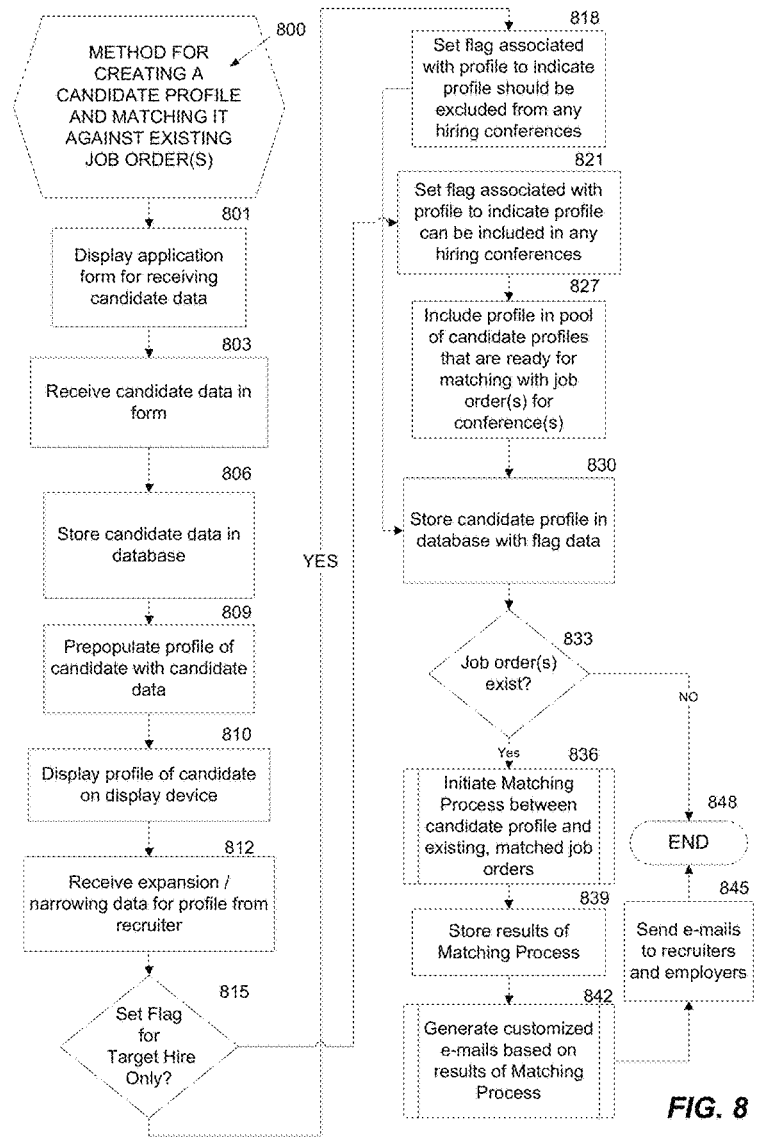
FIG. 8 is a logic flow diagram highlighting various steps of a method for creating a candidate profile and matching it against existing job orders/employer profiles according to an exemplary embodiment of the invention.

FIG. 8 is a logic flow diagram highlighting various steps of a method 800 for creating a candidate profile and matching it against existing job orders/employer profiles according to an exemplary embodiment of the invention. One of ordinary skill in the art will appreciate that the functions described herein as they relate to either the candidate profile or employer profile can comprise firmware code executing on a microcontroller, microprocessor, a DSP, or state machines implemented in application specific integrated circuits (ASICs), programmable logic, or other numerous forms without departing from the spirit and scope of the invention.

In other words, these steps illustrated in FIG. 8, and any other logic flow diagrams of this disclosure, may be provided as a computer program which may include a machine-readable medium having stored there on instructions which may be used to program a computer (or other electronic devices) to perform a process according to the invention. The machine-readable medium may include, but is not limited to, a floppy diskette, optical disk, CD-ROM, magneto-optical disks, ROMs, RAMs, EEPROMs, EEPROMs, magneto-optical cards, flash memory, or other type of medias/machine-readable mediums suitable for storing electronic instructions.

Further, certain steps in the processes or process flow described in this specification must naturally precede others for the invention to function as described. However, the invention is not limited to the order of the steps described if such order or sequence does not alter the functionality of the invention. That is, it is recognized that some steps may performed before, after, or parallel other steps without departing from the scope and spirit of the invention. In some instances, certain steps can be deleted or not performed without departing from the invention.

Additionally, one of ordinary skill and programming would be able to write computer code or identify appropriate hardware or circuits to implement the disclosed invention without difficulty based on the flow charts and associated description in the application text, for example.

Therefore, disclosure of a particular set of program code instructions or detailed hardware devices is not considered necessary for an adequate understanding of how to make and use the invention. The inventive functionality of the claimed computer implemented processes will be explained in more detail in the following description and in conjunction with the Figures which may illustrate various process flows.

Referring now to FIG. 8, step 801 is the first step of the method 800 in which an application form, such as the user interface of the computer display 300 of FIG. 3, is displayed for receiving candidate data. Next, in step 803, candidate data can be received in the form such as the name field 302, the e-mail field 304, in the home phone number field 306 as illustrated in FIG. 3.

In step 806, the candidate data can be stored in the database 179 in the form of one or more tables 184. Once the application form for the candidate data is completed by a recruiter, in step 809 the recruiterware module 149 can pre-populate the candidate profile user interface of FIG. 5. In step 810, the profile of the candidate which has pre-populated data fields can be displayed such as in the computer display 500 of FIG. 5.

In step 812, expansion and/or narrowing data for the candidate profile can be received by the user interface of FIG. 5 from the recruiter. Next, in decision step 815, it is determined whether the recruiter has indicated if a particular candidate should be selected for a target hire only instead of being considered for both target hire opportunities and conference opportunities. Target hire opportunities generally comprise those traditional opportunities that correspond with an employer seeking candidates for employment and who have completed an employer profile. Meanwhile, conference opportunities comprise those opportunities associated with job fairs or hiring conferences in which one or more employers may gather at a single, specific geographic location to meet candidates for interviews on particular scheduled days.

If the inquiry to decision step 815 is positive, then the "YES" branch is followed to step 818 in which a flag associated with the candidate profile is set to indicate that this particular candidate profile should be excluded from any hiring conference opportunities. The process then proceeds to step 830.

If the inquiry to decision step 815 is negative, then the "NO" branch is followed to step 821 in which the flag associated with the candidate profile is set to indicate that this particular candidate profile can be included in any hiring conference opportunities that may be available and tracked by the system 102. Next, in step 827, the candidate profile may be included in a pool of candidate profiles that are ready for matching with job orders/employer profiles associated with particular hiring conferences.

In step 830, the candidate profile with its corresponding hiring conference flag data is stored in the database 179 in the form of one or more tables and sub-tables as will be described below in connection with FIGS. 13 and 14. Next, in decision step 833, the recruiterware module 149 can query the database/server 179 to determine if any job orders/employer profiles exist in the database 179. If the inquiry to decision step 833 is negative, then the "NO" branch may be followed to step 848 in which the process 800 ends.

If the inquiry to decision step 833 is positive, then the "YES" branch is followed to routine 836 and which a matching process is initiated by the database 179 between the candidate profile just entered and any existing, matched job orders/employer profiles. Further details of the matching process or subroutine 836 will be described in further detail below in connection with FIG. 15A.

After routine 836, in step 839, the results of the matching process are stored in the database 179. Next, in routine or sub-method 842, customized e-mails can be generated based on the results of the matching process of routine 836. Further details of routine 842 which generates customized e-mails will be described below in connection with FIG. 18. After routine 842, in step 845, the customized e-mails can be sent to recruiters and employers. The process 800 then ends in step 848.

Figure 9:
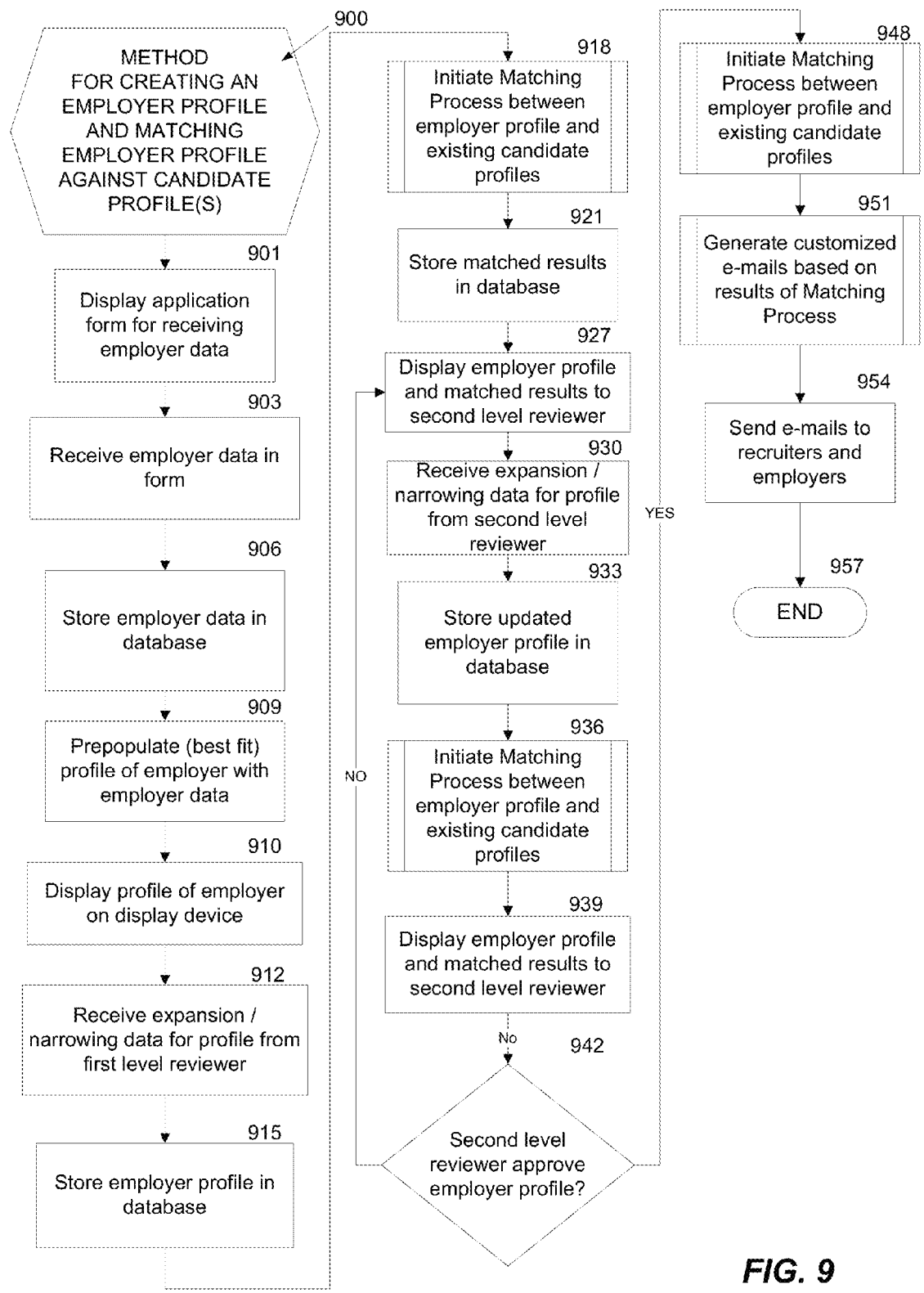
FIG. 9 is a logic flow diagram highlighting various steps of a method for creating an employer profile and matching the employer profile against candidate profiles according to an exemplary embodiment of the invention.

FIG. 9 is a logic flow diagram highlighting various steps of a method 900 for creating an employer profile and matching the employer profile against candidate profiles according to an exemplary embodiment of the invention. The first step of method 900 is step 901 in which an application form, such as the user interface of the computer display 400 in FIG. 4, can be displayed by the account representative client module 145 for receiving employer data from an employer/account representative. Next, in step 903, the employer data can be received by the account representative client module 145 in the form, such as receiving values for the military experience field 504 and the undergraduate degree field 508.

In step 906, the employer data can be stored in the database 179 in various formats such as in tables as will be described in further detail below. Next, in step 909, the account representative client module 145 can query the database 179 to pre-populate the employer profile with the data that is collected in step 903. In step 910, the profile of the employer can be displayed by the account representative client module 145 on a display device 147 such as the profile of a user interface displayed in FIG. 7.

In step 912, the account representative client module 145 can receive expanding or narrowing data in the user interface of FIG. 7 for the candidate profile from a first level reviewer or first employer representative. Next, in step 915, the employer profile as displayed in the computer display 700 of FIG. 7 can be stored in the form of various tables and sub-tables 184 within the database 179. Subsequently, in routine or sub-method 918, a matching process between the employer profile and existing candidate profiles can be initiated. Further details of routine 918 will be described below in connection with FIG. 16.

In step 921, the matched results from the matching sub-method or routine of 918 can be stored in a database 179. Next, in step 927, the employer profile of the user interface of FIG. 7 can be displayed along with the matched results to a second level reviewer or second employer representative that is more senior relative to the first level reviewer or first employer representative. Generally, the second level reviewer or second employer representative will have more experience than the first level reviewer in working with employer profiles. With this additional experience with employer profiles, the second level reviewer may be able to expand or narrow employer profiles appropriately such that an increased level of matching can occur between employer profiles and candidate profiles.

Specifically, in step 930, the account representative client module 145 can receive expansion and narrowing data for the employer profile from the second level reviewer who generally has more experience than the first level reviewer. In step 933, the updated employer profile of FIG. 7 is stored in the database 179. Next, in routine or sub-method 936, the matching process is initiated again between the employer profile and any existing candidate profiles, similar to routine 918 described above. Further details of routine 936 are described below in connection with FIG. 16. In step 939, the employer profile of FIG. 7 and corresponding matched results are displayed to a second level reviewer.

In decision step 942, it is determined whether the second level reviewer has approved the employer profile. If the inquiry to decision step 942 is negative, then the "NO" branches followed back to step 927 so that the second level reviewer can further update the employer profile and execute additional matches between the employer profile and existing candidate profiles.

If the inquiry to decision step 942 is positive, then the "YES" branches followed to routine or sub-method 948 in which the matching process between the employer profile and existing candidate profiles is initiated once again, similar to routines 918 and 936. Like routines 918 and 936, further detail of this routine 948 will be described below in connection with FIG. 16. Next, in routine or sub-method 951, customized e-mails can be generated based on the results of the matching process of routine 948. Further details of routine 951 will be described below in connection with FIG. 18. Subsequently, in step 954, the customized e-mails generated in routine 951 can be sent to recruiters and employers. The process 900 then ends in step 957.

FIG. 10 is an exemplary table 1000 which lists a weighting scale and the effects of selected parameters for employer profiles on candidate profiles according to an exemplary embodiment of the invention. As noted in the table 1000, when a parameter or value in an employer field of FIG. 7 is listed, then during the matching process if a candidate matches the parameter, a value of one is assigned to the corresponding candidate field. During the matching process, if a candidate profile does not match a parameter which is listed in employer field, then a value of zero is assigned to the corresponding candidate field. This weighting and logic is fully described in and articulated in the first row of table 1000.

In the second row of table 1000, the impact of the required field 702 of the computer display 700 for the employer profile is described. Specifically, if a parameter or value in an employer field is indicated as required when the required field 702 is selected, then during the matching process candidate profiles that do not have this value in a corresponding field are eliminated from the matching process.

In the third row of table 1000, the impact of the preferred field 704 of the computer display 700 for the employer profile is described. Specifically, if a parameter or value in an employer field is indicated as preferred when the preferred field 704 is selected, then during the matching process candidates profiles that have this value in a corresponding field are assigned a value of three for this particular candidate field. If the candidate profile does not match this value for the particular employer field, then a value of zero is assigned to the corresponding candidate field.

And lastly, in the fourth row of table 1000, the impact of selecting both the required field 702 and preferred field 704 of the computer display 700 for the employer profile is described. Specifically, if a parameter or value in an employer field is indicated as preferred and required when the preferred field 704 and the required field 702 are selected, then during the matching process candidate profiles who do not have values which matched this particular employer field are illuminated from the match. However, for those candidate profiles which do have values that match this particular employer field are assigned a value of three for this particular candidate field. While specific weighting values have been described above in connection with table 1000, one of ordinary skill the art will appreciate that other weighting values and schemas for assigning these weighting values are within the scope of the invention.

FIG. 11 is an exemplary table 1100 that can be stored in memory, such as in the database 179 of FIG. 1, and which lists the parameters that may be tracked for an employer profile according to an exemplary embodiment of the invention. The first column of the table 1100 refers to fields from an employer profile such as illustrated in FIG. 7. The second column of the table 1100 lists a numerical value which corresponds to the field contained within a particular row. For example, each employer profile may be assigned a unique identification number 1103. In the example listed in table 1100, unique identification number 1103 can have a value of 18979. Similarly, the initial data entered for a particular employer profile through the computer display 400 of FIG. 4 can also be assigned a unique identification number 1106. In the example listed in table 1100, this unique identification number can have a value of 87654.

The values listed in table 1100 can also correspond with the values selected for the required field 702 and the preferred field 704. This means that for the third row of table 1100 which lists the diversity field, this field has been assigned a value 1109 that comprises one. In this exemplary embodiment, this means that the diversity field has been requested by an employer as being required. If this value 1109 have been assigned a magnitude of zero, then this would have meant that the employer does not require diversity status for the particular job order being matched.

Similarly, for the military experience preferred field of the fifth row of table 1100, this field has been assigned a value 1121 that comprises one. In this exemplary embodiment, this means that the military experience preferred field has been requested by an employer as preferred. In other words, had the value 1121 that assigned a magnitude of zero, then such a value would indicate that the employer has no preference for military experience for candidates of a job order.

Other values 1112, 1121, 1127, 1130, and 1136 have been assigned for other various employer profile fields such as the auto match date which corresponds to when a match was completed for a particular employer profile. The other values correspond to a military experience required field, a total possible points field, a salary field, and a security clearance field. It is noted that certain values within the table 1100 may be derived from a type identifier numeric value in combination with another numeric identifier. For example, for the salary field listed in table 1100, the value 1130 associated with the salary field has been assigned a number of 2.7. This means that the type identifier for this value 1130 is two and the regular identifier is seven. This type identifier and regular identifier are used to track values assigned to fields of the employer profile in a lookup table 1300 which will be described in further detail below. The invention is not limited to the table 1100 described above and the additional tables 1200-1400 described below. One of ordinary skill the art recognizes that other styles or techniques that may be different from what is disclosed in these exemplary embodiments for tracking data are well within the scope of the invention.

FIG. 12 is an exemplary sub-table 1200 that can be stored in memory, such as in the database 179 of FIG. 1, and which lists exemplary parameters that may be tracked for a particular field of an employer profile according to an exemplary embodiment of the invention. This sub-table 1200 can be used to track the values assigned to a service branch field from an employer profile. In the exemplary embodiment illustrated in FIG. 12, the employer profile unique identifier has been assigned a value 1103 that is equal to the value 1103 of table 1100. This means that the branch sub-table 1200 of FIG. 12 corresponds with the specific employer profile being tracked in the matching table 1100 of FIG. 11. The branch identifier field in the third row of the sub-table 1200 has been assigned a value 1203 having a magnitude of 3, 1. This value 1203 generally corresponds with the type identifier column and identifier column of table 1300 and FIG. 13. Further details of table 1300 will be described below in connection with FIG. 13.

FIG. 13 is an exemplary look-up table 1300 that can be stored in memory, such as in the database 179 of FIG. 1, and which lists exemplary parameters that comprise numbers and/or alpha numeric text which are translations or shorthand for values and fields used in candidate profiles and employer profiles according to one exemplary embodiment of the invention. The lookup table 1300 of FIG. 13 can comprise the main table which is cross reference by all other tables in the database 179.

For example, in the fourth row of the look-up table 1300, the type identifier column has been assigned a value of three while the second column for the identifier has been assigned a value of one. These two numeric values correspond to a service branch field having text value 1303 that defines the U.S. Air Force branch. This fourth row of the lookup table 1300 generally corresponds with of the branch sub-table 1200 for the employer profile. As noted previously, the branch identifier in the sub-table 1200 was assigned a value 1203 having a magnitude of 3.1. This magnitude of 3.1 corresponds to the "Airforce" value 1503 tracked in the fourth row of the main look-up table 1300 of the database 179.

FIG. 14 is an exemplary table 1400 that can be stored in memory, such as in the database 179 of FIG. 1, and which lists the translated values for the fields within a candidate profile according to one exemplary embodiment of the invention. In the exemplary table 1400, the particular candidate associated with this table 1400 has been assigned a security clearance in the fourth row having a value 1403 equal to 5.1. This value 1403 generally corresponds with the eighth row and value 1315 of the look-up table 1300 of FIG. 13. The value 1315 of the look-up table 1300 comprises the text of "top-secret poly" which can be a certain level of security clearance. The security clearance field, as illustrated in FIG. 13, can have other values selected by an employer. For example, the security clearance field can have any one of the following text values/magnitudes: top-secret poly, top secret SSB1, top secret, secret, and no clearance.

Figure 15A:
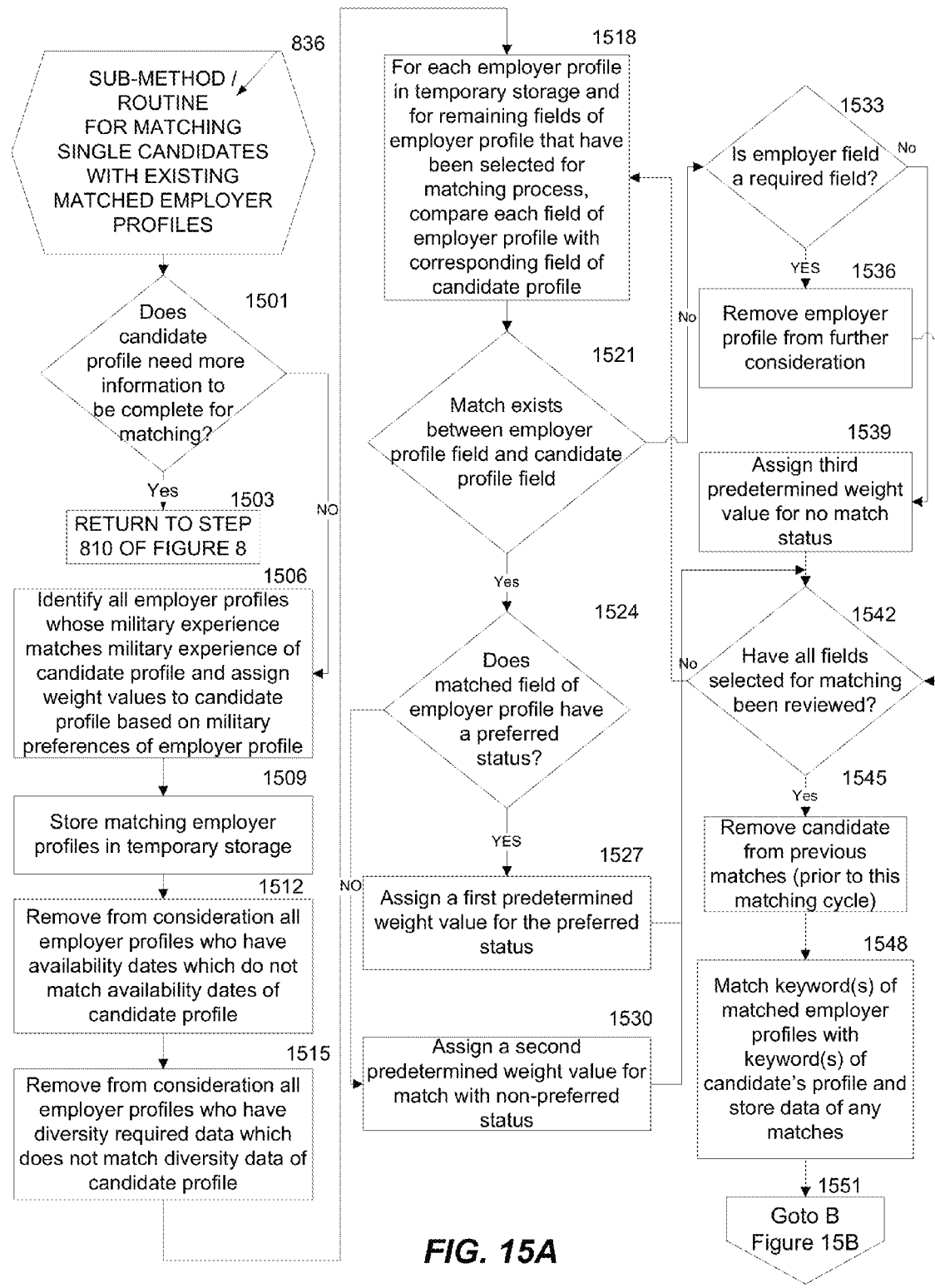
FIG. 15A is a logic flow diagram highlighting various steps of a method for matching single candidates with existing matched employer profiles according to an exemplary embodiment of the invention.

FIG. 15A is a logic flow diagram highlighting various steps of a sub-method or routine 836 for matching single candidates with existing matched employer profiles according to an exemplary embodiment of the invention. Decision step 1501 is the first step of routine 836 and which the server 179 determines if a candidate profile needs more information to be complete for matching. In other words, the server 179 determines whether the need documents status field 503 of FIG. 5 has been selected by a recruiter to indicate that a candidate cannot be matched at this time since the candidate may need more documentation to complete his or her profile.

If the inquiry to decision step 1501 is positive, then the "YES" branch is followed to step 1503. Step 1503 returns the process to step 810 of FIG. 8. If the inquiry to decision step 1501 is negative, then the "NO" branch is followed to step 1506. In step 1506, all existing employer profiles whose military experience matches the military experience of a candidate profile are identified. Weight values are assigned to the candidate profile that match the employer profiles based on military preferences listed in the employer profile. The inventors have discovered that this step 1506 which checks for military preferences of employer profiles can significantly reduce or cull down the amount of data which is handled during the remainder of the matching process.

In step 1509, the matching employer profiles are stored in temporary storage such as in a table in the database 179. In step 1512, all employer profiles who have availability dates which do not match the availability dates of the candidate profile are removed from the temporary storage. Like step 1506, the inventors have discovered that this removal step 1512 also reduces or cull downs the amount of data handled during the remainder of the matching process described below.

In step 1515, all employer profiles who have diversity required data which does not match the candidate profile are removed from the temporary storage. Also like step 1506, the inventors have discovered that this removal step 1515 also reduces or cull downs the amount of data handled during the remainder of the matching process described below.

Next, in step 1518, for each employer profile in temporary storage and for remaining fields of the employer profiles that have been selected for the matching process, each field of the employer profile is compared by the server 179 to a corresponding field of the candidate profile. In decision step 1521, the server 179 determines if a match exists between an employer profile field and a candidate profile field. If the inquiry to decision step 1521 is negative, then the "NO" branch is followed to decision step 1533.

If the inquiry to decision step 1521 is positive, then the "YES" branch is followed to decision step 1524. In decision step 1524, the server 179 determines if the matched field of the employer profile has a preferred status. If the inquiry to decision step 1524 is positive, then the "YES" branch is followed to step 1527 in which a first predetermined weight value is assigned to the candidate profile for the preferred status indicated. According to an exemplary embodiment, this predetermined weight value has a numeric value of three. However, one of ordinary skill the art recognizes that other predetermined weight values can be used which are within the scope of the invention.

If the inquiry to decision step 1524 is negative, then the "NO" branch is followed to step 1530 in which a second predetermined weight value for a match with a non-preferred status is assigned to the corresponding field of the candidate profile. According to an exemplary embodiment, the value associated with a match but without any preferred status has a numeric value of one. However, one of ordinary skill the art recognizes that other predetermined weight values can be used which are within the scope of the invention. After step 1527 and step 1530, the sub-method 836 continues to decision step 1542.

In decision step 1533, it is determined whether the employer field under consideration has been marked as being required. If the inquiry to decision step 1533 is positive, then the "YES" branch is followed to step 1536 in which the employer profile is removed from further consideration relative to the candidate being examined during the sub-method 836.

If the inquiry to decision step 1533 is negative, then the "NO" branch is followed to step 1539 in which a third predetermined value is assigned to the corresponding candidate field for the no-match status. According to an exemplary embodiment, this third predetermined value can have a magnitude of zero or the null set. However, one of ordinary skill the art recognizes that other predetermined weight values can be used which are within the scope of the invention.

After step 1539, a sub-method 836 continues to decision step 1542. In decision step 1542, it is determined whether all of the fields selected for matching have been reviewed by the server 179. The fields generally addressed by steps 1518 through 1539 include those listed in Table 1, excluding the military experience field, availability date field, and the diversity required field addressed in steps 1506, 1512, and 1515. If the inquiry to decision step 1542 is negative, then the "NO" branch is followed back to step 1518. If the inquiry to decision step 1542 is positive, then the "YES" branch is followed to step 1545.

In step 1545, the particular candidate profile being considered during sub-method 836 can be removed from previous matches prior to the current execution of sub-method 836. Next, in step 1548, keywords of the matched employer profiles can be compared and matched to the current candidate profile under consideration. Any matches with keywords can be stored in the database 179. In step 1551, the process continues to step 1554 of FIG. 15B.

Figure 15B:
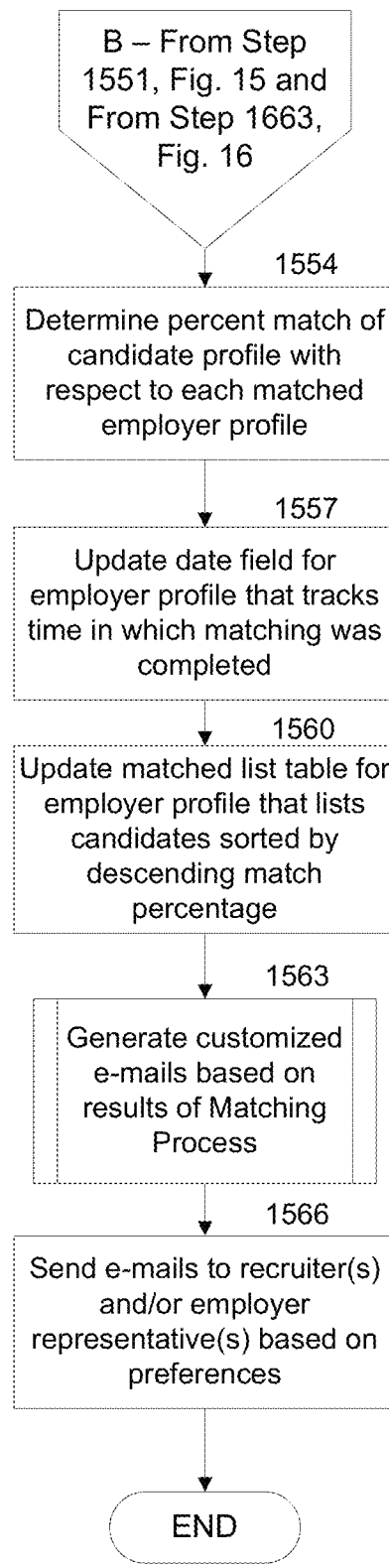
FIG. 15B is logic flow diagram that is a continuation of FIG. 15A and FIG. 16 and which highlights various steps for generating output in the form of e-mails according to an exemplary embodiment of the invention.
Figure 16:
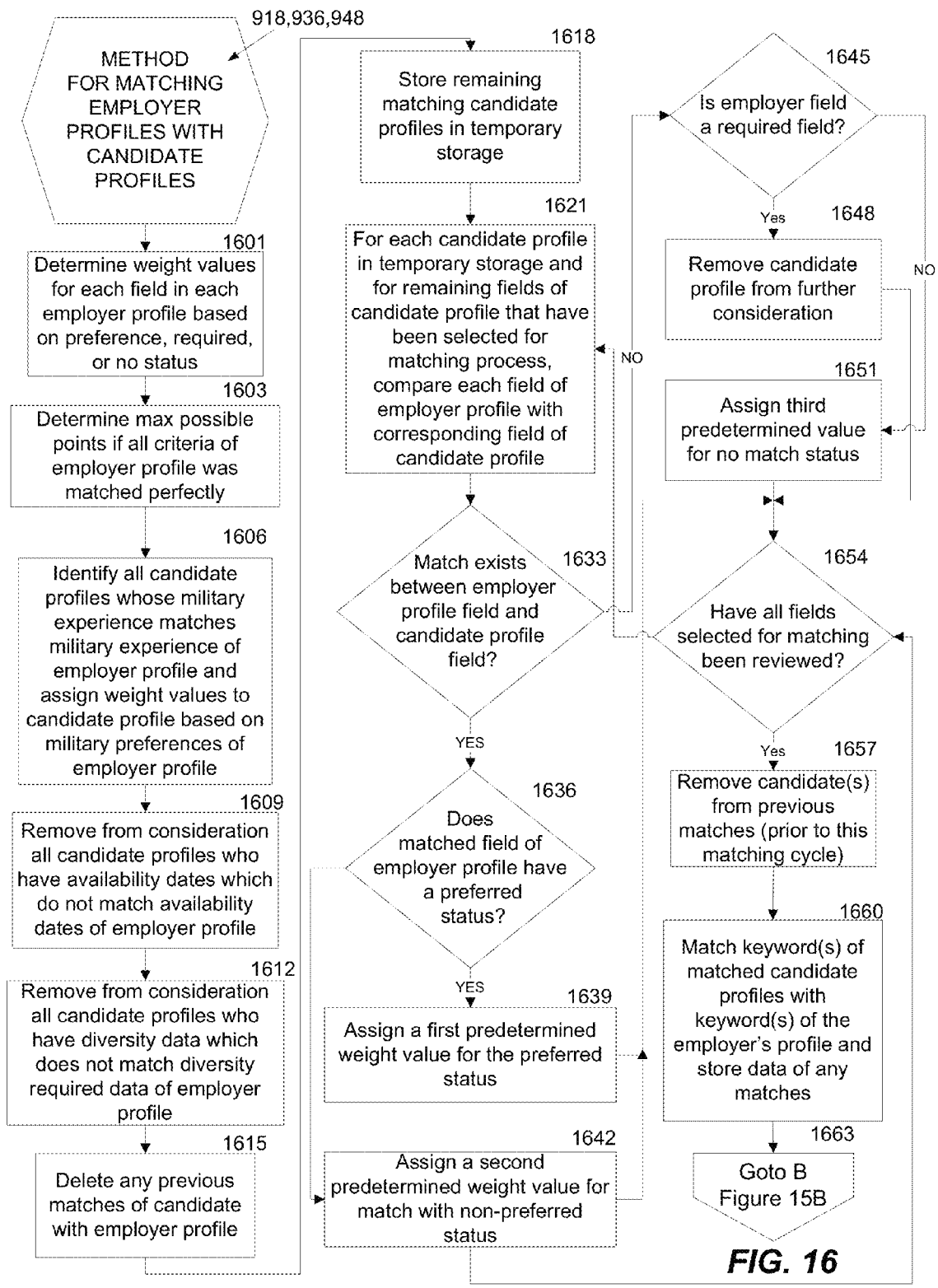
FIG. 16 is a logic flow diagram highlighting various steps of a method for matching employer profiles with candidate profiles according to an exemplary embodiment of the invention.

FIG. 15B is logic flow diagram that is a continuation of FIG. 15A and FIG. 16 and which highlights various steps for generating output in the form of e-mails according to an exemplary embodiment of the invention. In step 1554, the percent match of each candidate profile is determined with respect to each matched employer profile. Next, in step 1557, the date field for the employer profile that tracks the time in which the matching process was completed is updated. In step 1560, the matched list table for the employer profile that list candidates sorted by descending match percentage is updated.

In sub-method or routine 1563, customized e-mails can be generated based on the results of the matching process. Further details of routine 1563 will be described below in connection with FIG. 18. After routine 1563, in step 1566, e-mails can be sent over the communications network 173 to recruiters and/or employer representatives based on preferences selected by the recruiters or employer representatives. After step 1566, the process ends.

FIG. 16 is a logic flow diagram highlighting various steps of sub-methods or routines 918, 936, 948 for matching employer profiles with candidate profiles according to an exemplary embodiment of the invention. Step 1601 is the first step of routines 918, 936, 948. In step 1601, the server 179 determines the weight values for each field in each employer profile based on the preference field 704, the required field 702, or no status selections of the employer profile of the computer display 700 in FIG. 7. Next, in step 1603, the maximum number of points based on if all criteria of an employer profile was matched perfectly can be determined by the server 179.

In step 1606, the server 179 can identify all candidate profiles whose military experience matches the military experience of the employer profile under consideration. The server 179 can also assign weight values to the candidate fields of the candidate profile based on the military preferences listed in the employer profile. The inventors have discovered that this step 1606 can significantly reduce or cull downs the amount of data processed after this step when only matches to the military experience fields are considered from this step onward.

Next, in step 1609, the server 179 can remove from consideration all candidate profiles who have availability dates which do not match the availability dates of the particular employer profile under consideration. Like step 1606, the inventors have discovered that this step also significantly reduces or cull downs the amount of data processed after this step.

In step 1612, the server 179 can then remove from consideration all candidate profiles who have diversity data which does not match the diversity required data for a particular employer profile under consideration. Similar to steps 1606 and 1609, the inventors have discovered that this step also significantly reduces or cull downs the amount of data processed after this step.

In step 1615, any previous matches of the candidate profile with the current employer profile are deleted. In step 1618, the remaining matching candidate profiles up to this step 1618 are stored in temporary storage by the server 179. In step 1621, for each candidate profile in temporary storage and for the remaining fields of the candidate profile that have been selected for the matching process, each field of the employer profile is compared with a corresponding field of the candidate profile by the server 179.

In decision step 1633, the server 179 determines if a match exists between the employer profile field and the current candidate profile field under consideration. If the inquiry to decision step 1633 is negative, then the "NO" branch is followed to decision step 1645. If the inquiry to decision step 1633 is positive, then the "YES" branch is followed to decision step 1636. In decision step 1636, the server 179 determines if the current matched field of the employer profile has a preferred status.

If the inquiry to decision step 1636 is positive, then the "YES" branch is followed to step 1639 in which a first predetermined weight value for the preferred status is assigned to the corresponding field of the candidate profile. According to one exemplary embodiment, this first predetermined weight value for the preferred status has a numeric value of three. However, one of ordinary skill the art recognizes that other weight values can be used and which are within the scope of the invention.

If the inquiry to decision step 1636 is negative, then the "NO" branch is followed to step 1642. In step 1642, the server 179 assigns a second predetermined weight value for the match with the non-preferred status. According to one exemplary embodiment, this second predetermined weight value for the non-preferred status has a numeric value of one. However, one of ordinary skill in the art recognizes that other weight values can be used and which are within the scope of the invention.

After steps 1639 and 1642, the process continues to decision step 1645. In decision step 1645, the server 179 determines if the current employer field under consideration is a required field. If the inquiry to decision step 1645 is positive, then the "YES" branch is followed to step 1648. In step 1648, the candidate profile is removed from further consideration.

If the inquiry to decision step 1645 is negative, then the "NO" branch is followed to step 1651 in which a third predetermined weight value is assigned for the no-match status. According to one exemplary embodiment, the third predetermined weight value has a magnitude of zero or the null set. However, one of ordinary skill in the art recognizes that other weight values can be used without departing from the scope of the invention.

In decision step 1654, the server 179 determines if all fields that have been selected for matching have been reviewed. The fields generally addressed by steps 1621 through 1651 include those listed in Table 1, excluding the military experience field, availability date field, and the diversity required field which are addressed in steps 1606, 1609, and 1612. If the inquiry to decision step 1654 is negative, then the "NO" branch is followed back to step 1621. If the inquiry to decision step 1654 is positive, then the "YES" branch is followed to step 1657.

In step 1657, the server 179 removes candidates from previous matches prior to the current matching cycle or execution of routines 918, 936, 948. In step 1660, the server 179 can match keywords of matched candidate profiles with keywords of the employer's profile and store the data in memory. In step 1663, the process continues to step 1550 of FIG. 15B described above.

Figure 17:
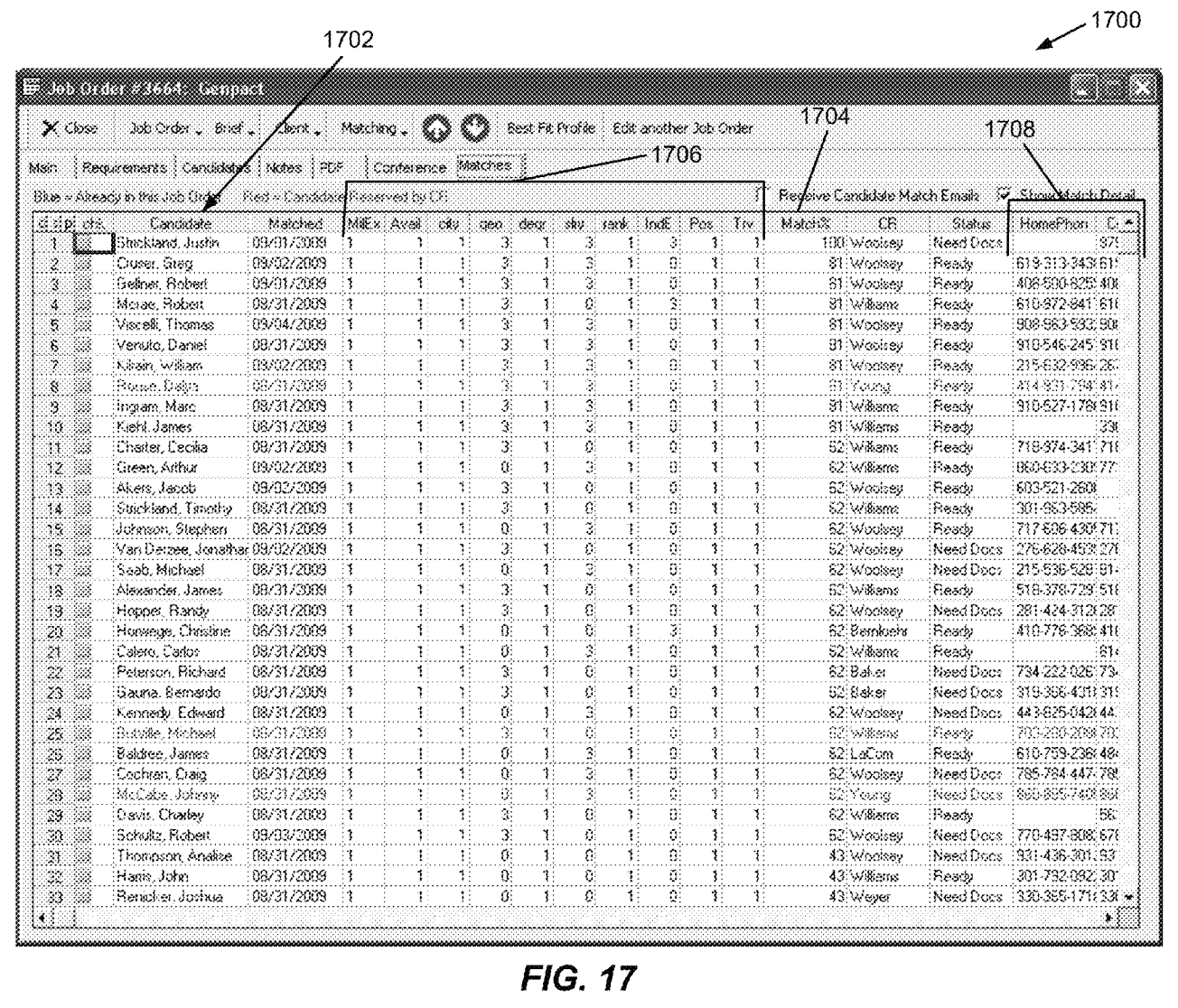

FIG. 17 is an exemplary computer display 1700 of a user interface which displays results of an employer profile match according to an exemplary embodiment of the invention. In this exemplary embodiment, the candidates 1702 which matched a particular employer profile are listed in descending order based on the percent match listed in the percent match column 1704. This user interface can also display the raw or actual weight values 1706 that were calculated by the server 179. This user interface can also display contact information 1708 for each candidate 1702 that is listed.

Figure 18:
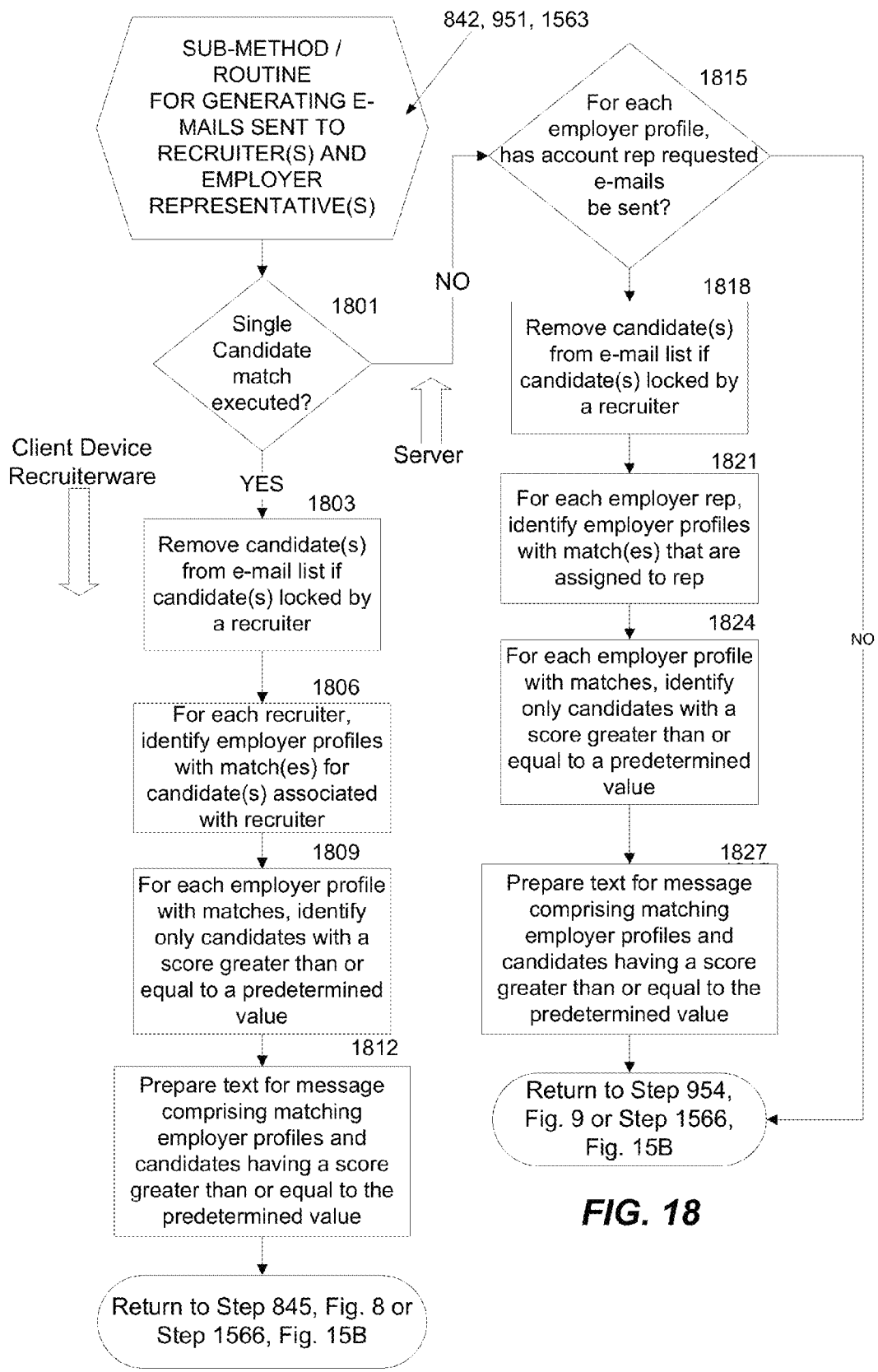
FIG. 18 is a logic flow diagram highlighting various steps of a sub-method for generating e-mails sent to recruiters and employer representatives according to an exemplary embodiment of the invention.

FIG. 18 is a logic flow diagram highlighting various steps of a sub-method 842, 951, 1563 for generating e-mails that can be sent to recruiters and employer representatives according to an exemplary embodiment of the invention. This sub-method 842, 951, 1563 generally corresponds to FIGS. 8, 9, and 15B. Decision step 1801 is the first step of the sub-method or routine 842, 951. In decision step 1801, it is determined whether a single candidate match has been executed. This decision step 1801 may comprise a purely logical function and not actually practiced by a computing device since automated e-mail generation can be performed by either the server 179 or the recruiterware e-mail module 143 residing in the client device 100A.

So this means if a single candidate match was executed (meaning that the inquiry to decision step 1801 is positive ant that a single candidate match of FIG. 15A was executed), then the recruiterware e-mail module 143 can execute the remaining steps 1803 through 1812. Alternatively, if a single candidate match was not executed (meaning that the inquiry to decision step 1801 is negative and that an employer profile match of FIG. 16 was executed), then the server 179 can execute the remaining steps 1818 through 1827.

If the inquiry to decision step 1801 is positive, then the "YES" branch is followed to step 1803. In step 1803, the recruiterware e-mail module 143 removes candidates from an e-mail listing of the matched results if the candidate has been locked by a recruiter. Specifically, this step corresponds to the ability of a recruiter to select a candidate from a prior e-mail listing of matched results. The recruiter can indicate to the server 179 that a candidate may have already submitted applications to one or more employers and should not be considered for any future opportunities at this point in time.

In step 1806, for each recruiter, the recruiterware e-mail module 143 identifies employer profiles with matches for candidates associated with a particular recruiter. Next, in step 1809, for each employer profile with matches, the recruiterware e-mail module 143 identifies only those candidates with a score greater than or equal to a predetermined value. According to one exemplary embodiment, this exemplary predetermined value can be set equal to 50% relative to the percent or degree of match with a particular employer profile.

Figure 20:
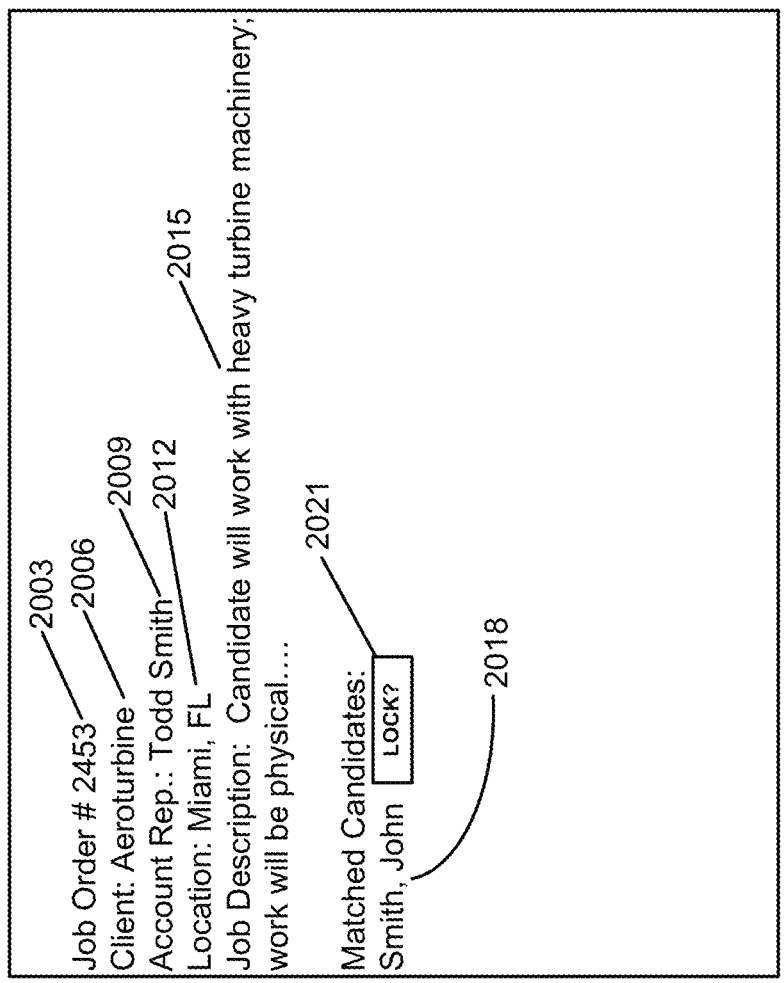
FIG. 20 illustrates exemplary contents of an e-mail generated for a employer profile match that can be sent to a recruiter according to an exemplary embodiment of the invention.

Next, in step 1812, the recruiterware e-mail module 143 can prepare text for the e-mail message that comprises the matched employer profiles and candidates having a score greater than or equal to the predetermined value. An exemplary e-mail message is illustrated in FIG. 20 and discussed in further detail below. The process then returns to either step 845 of FIG. 8 or step 1566 of FIG. 15B.

If the inquiry to decision step 1801 is negative, then the "NO" branch is followed to decision step 1815 and which the server 179 can execute the remaining steps 1818 through 1827. In decision step 1815, the server 179 determines for each employer profile whether the employer representative has indicated whether the representative wants to receive e-mails about employer profile matches. This step generally corresponds with the ability of an employer representative to turn on a notice function for receiving automated e-mails that correspond to matched employer profiles.

If the inquiry to decision step 1815 is negative, then the "NO" branch is followed in which the process returns to step 954 of FIG. 9 or step 1566 of FIG. 15B. In step 1818, the server can remove candidates from the e-mail list if a particular candidate was locked by a recruiter as discussed above in connection with step 1803. Next, in step 1821, for each employer representative, the server 179 can identify those employer profiles with matches that are assigned to a particular employer representative.

In step 1824, for each employer profile that has matches, the server 179 identifies the candidates with a score greater than or equal to a predetermined value. According to one exemplary embodiment, this predetermined value can comprise a magnitude of 50%. However, one of ordinary skill in the art recognizes that other magnitudes for this predetermined value without departing from the scope of the invention.

In step 1827, the text is prepared for the message for the matching employer profiles and candidates who have a score greater than or equal to the predetermined value discussed above. An exemplary e-mail message generated by the server 179 is illustrated in FIG. 19 and discussed in further detail below. The process then returns to step 954 of FIG. 9 or step 1566 of FIG. 15B.

FIG. 19 illustrates exemplary contents of an e-mail message 1900 generated for a candidate profile match that can be sent to an employer representative according to an exemplary embodiment of the invention. As noted previously, this e-mail message 1900 can be generated by the server 179. The e-mail message 1900 can comprise employer profiles 1905 which are associated with a particular account representative so that each account representative is receiving a unique e-mail message 1900 based upon the employers assigned to a particular account representative. The e-mail messages 1900 can further comprise candidate information 1910 which lists the names of the candidates who scored above the predetermined and exemplary value of 50%. One of ordinary skill in the art recognizes that additional and different information about matched employer profiles can be provided in the e-mail message 1900 and would be within the scope of the invention.

FIG. 20 illustrates exemplary contents of an e-mail message 2000 generated for a employer profile match that can be sent to a recruiter according to an exemplary embodiment of the invention. The e-mail message 2000 may comprise various fields such as, but not limited to, an employer profile identifier 2003, the name of the employer 2006, the account representative assigned to the employer 2009, the location of the opportunity 2012, and the job description 2015. Under these various fields for each matched employer profile, a listing of the matched candidates who have scores greater than or equal to the predetermined value can be listed. Adjacent to each candidate can be a lock button 2021 which can allow a recruiter to lock out a candidate from receiving information on any future opportunities as discussed above in steps 1803 and 1818 of FIG. 18.

Figure 21:
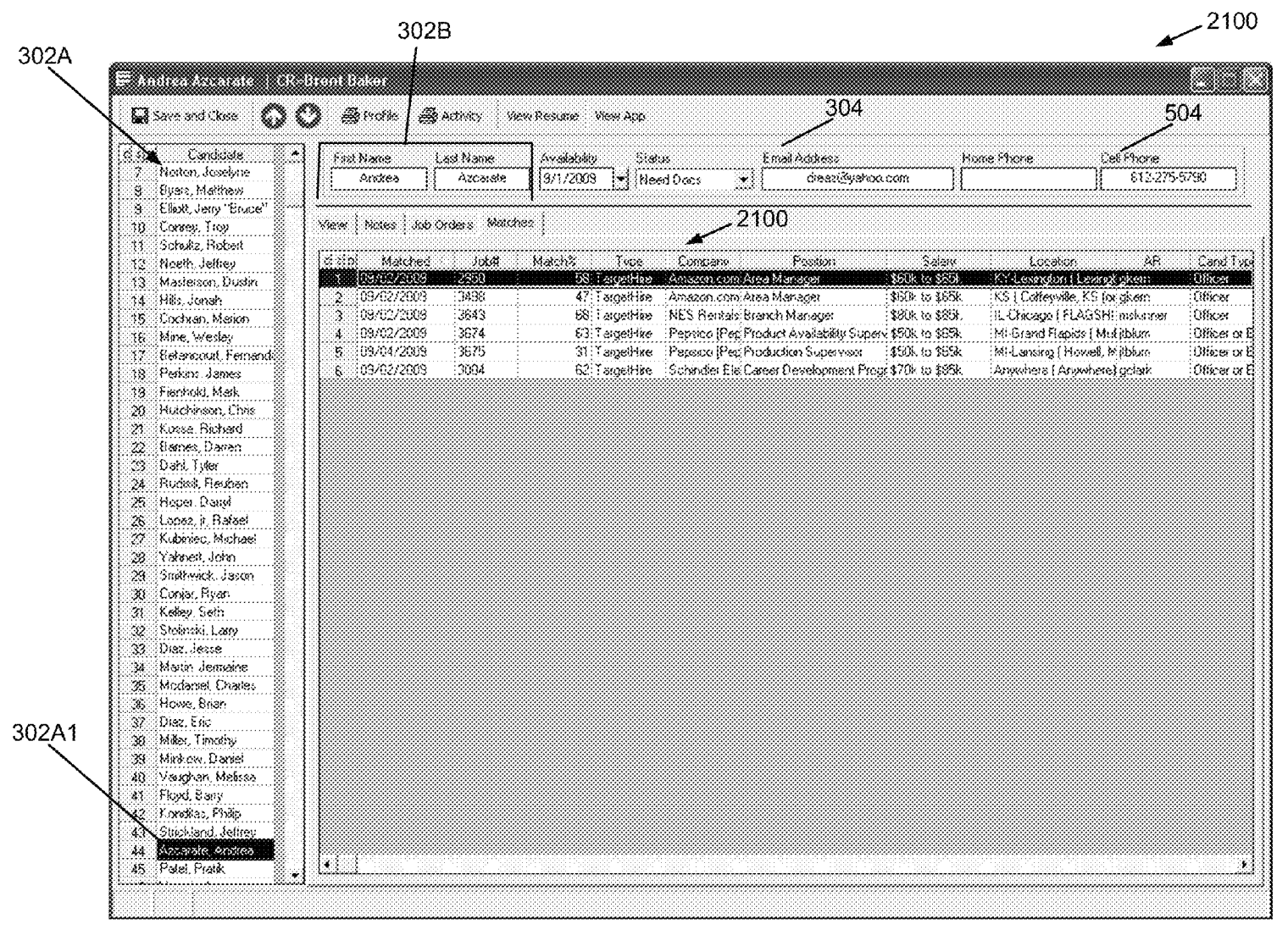

FIG. 21 is an exemplary computer display 2100 of a candidate profile which displays the employer profiles matched to the candidate according to an exemplary embodiment of the invention. In this exemplary display 2100, when a particular candidate 302A1 is selected from the list 302A, further details of the employer profiles 2105 which match the candidate can be displayed. Additional details about the selected candidate 302A1 can also be displayed such as, but not limited to, contact information that includes e-mail address information 304 and cell phone information 504. Other fields that can be displayed which may be relevant to a particular candidate 302A1 are within the scope of the invention.

Figure 22:
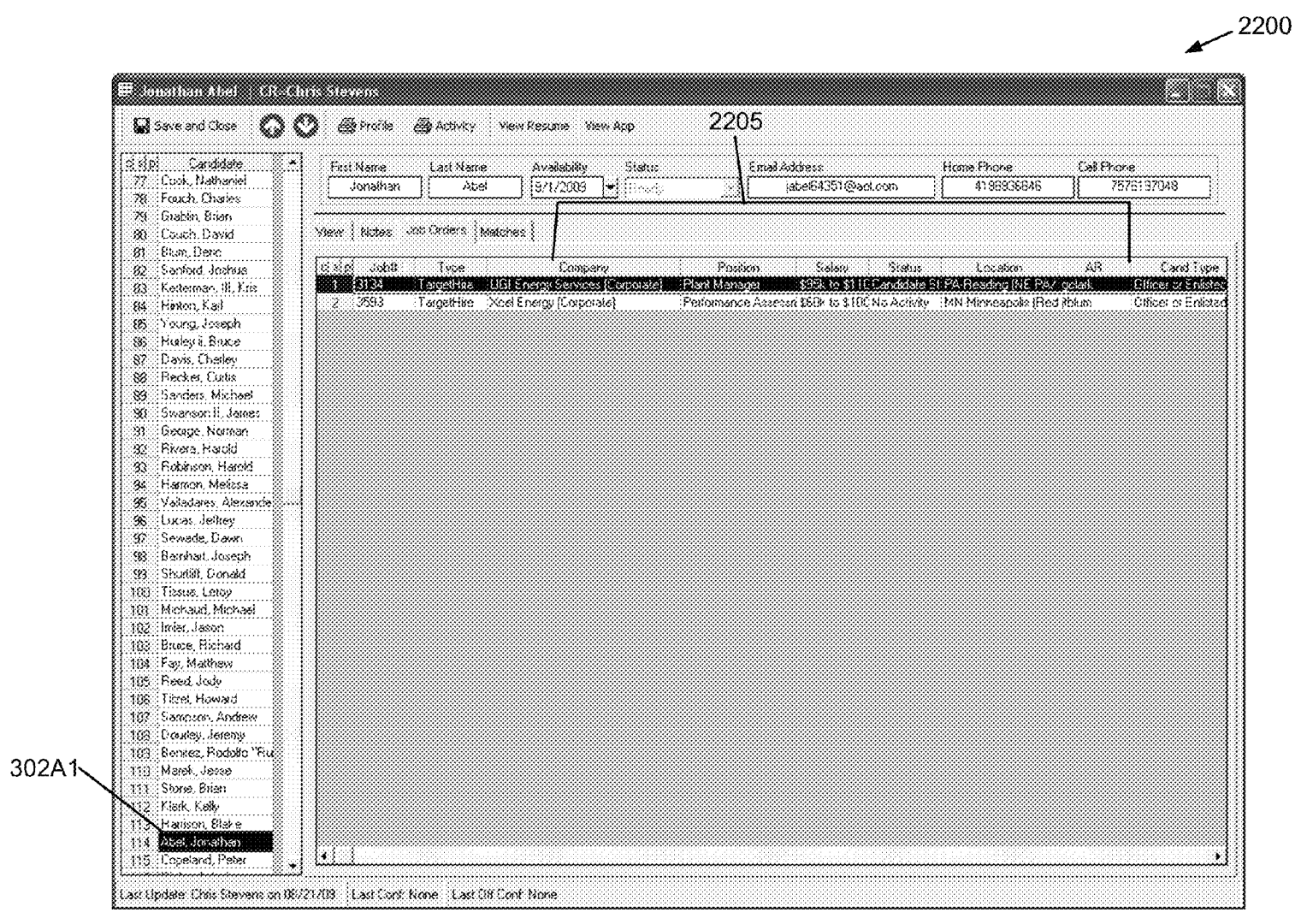

FIG. 22 is an exemplary computer display 2200 of a candidate profile which displays the employer profiles 2205 in which the candidate has submitted an application and/or resume according to an exemplary embodiment of the invention. In this exemplary embodiment, employer profiles 2205 can correspond with a candidate 302A1 that is selected from a list 302A of matched candidates and in which the candidate 302A1 is actively pursuing employment with the potential employer listed. Other fields that can be displayed which may be relevant to a particular candidate 302A1 are within the scope of the invention.

Alternative embodiments for the method and system 102 for matching civilian employers with candidates having prior military experience will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention.

What is claimed is:

1. A computer-implemented method for matching civilian employers with candidates having prior military experience, comprising:

receiving input via a server on a computer system for one or more first military service fields corresponding to military experience of a candidate profile, the input for the one or more first military service fields comprising a selection of one or more military terms from a first listing of military terms, the military terms corresponding to one of skills and experience acquired by the candidate during service in an armed force;

receiving input via the server for one or more second military service fields corresponding to an employer profile, the input for the one or more second military service fields comprising a selection of one or more military terms from a second listing of military terms, the first listing of military terms being identical to the second listing of military terms;

receiving input via the server for one or more non-military service fields of a candidate profile and one or more non-military service fields of an employer profile;

identifying, by the server, an employer profile whose desired level of military service matches a level of military service of a candidate profile;

storing the employer profile in a memory if the desired level military service for the employer profile matches the level of military service for the candidate profile;

comparing, by the server, military service fields in the employer profile stored in the memory against military service fields in the candidate profile;

assigning weight values to military service fields of the candidate profile by the server based on a degree of matching between the military service fields of the employer profile and the candidate profile, the assigning weight values to military service fields further comprising assigning a first weight value to a military service field of a candidate profile if a status of the military service field in a corresponding employer profile is preferred; and assigning a second weight value to a military service field of a candidate profile if a status of the military service field in a corresponding employer profile is not preferred;

comparing, by the server, non-military service fields in the employer profile against military service fields in the candidate profile;

assigning weight values to non-military service fields of the candidate profile by the server based on a degree of matching between the military service fields of the employer profile and the candidate profile; and determining, by the server, a percent match of the candidate profile with respect to the matched employer profile based on the assigned weight values to the military service fields and non-military service fields in the candidate profile.

2. The computer-implemented method of claim 1, further comprising removing the employer profile from the memory by the server if it does not match availability dates of the candidate profile.

3. The computer-implemented method of claim 1, further comprising removing the employer profile from the memory by the server if its required diversity data does not match diversity data of a candidate profile.

4. The computer-implemented method of claim 1, wherein the desired level of military service comprises a length of time served in the military.

5. The computer-implemented method of claim 1, wherein the military service fields further comprise at least one of military rank, military branch of service, military MOS, security clearance held, certifications held, and licenses held.

6. The computer-implemented method of claim 1, wherein the non-military service fields comprise at least one of undergraduate school, undergraduate degree, undergraduate major, undergraduate GPA, undergraduate graduation year, graduate degree, diversity data, interpersonal rating, industry experience, city preferences, foreign languages spoken, job titles, geo-region preferences, salary requirements, salary bonuses desired, shift work, and travel percentage.

7. The computer-implemented method of claim 1, further comprising generating an e-mail by the server that comprises a listing of one or more matched employer profiles.

8. A computer-implemented method for matching civilian employers with candidates having prior military experience, comprising:

receiving input via a server on a computer system for one or more first military service fields corresponding to military experience of a candidate profile, the input for the one or more first military service fields comprising a selection of one or more military terms from a first listing of military terms, the military terms corresponding to one of skills and experience acquired by the candidate during service in an armed force;

receiving input via the server for one or more second service military fields corresponding to an employer profile, the input for the one or more second service military fields comprising a selection of one or more military terms from a second listing of military terms, the first listing of military terms being identical to the second listing of military terms;

receiving input via the server for one or more non-military service fields of a candidate profile and for one or more non-military service fields of an employer profile;

identifying, by the server, a candidate profile whose level of military service matches a desired level of military service of an employer profile;

storing the candidate profile in a memory if a candidate profile whose level of military service matches the desired level of military service of the employer profile;

comparing, by the server, military service fields in the candidate profile against military service fields in the employer profile;

assigning weight values to military service fields of the candidate profile by the server based on a degree of matching between the military service fields of the employer profile and the candidate profile, the assigning weight values to military service fields further comprising assigning a first weight value to a military service field of a candidate profile if a status of the military service field in a corresponding employer profile is preferred; and assigning a second weight value to a military service field of a candidate profile if a status of the military service field in a corresponding employer profile is not preferred;

comparing, by the server, non-military service fields in the employer profile against military service fields in the candidate profile;

assigning weight values to non-military service fields of the candidate profile by the server based on a degree of matching between the military service fields of the employer profile and the candidate profile; and determining, by the server, a percent match of the candidate profile with respect to the matched employer profile based on the assigned weight values to the military service fields and non-military service fields in the candidate profile.

9. The computer-implemented method of claim 8, further comprising determining weight values for the employer profile by the server based upon preference data.

10. The computer-implemented method of claim 9, further comprising determining a maximum number of score points by the server for the employer profile.

11. The computer-implemented method of claim 8, wherein the desired level of military service comprises time served in the military.

12. The computer-implemented method of claim 1, wherein the military service fields further comprise at least one of military rank, military branch of service, military MOS, security clearance held, certifications held, and licenses held.

13. A computer system for matching civilian employers with candidates having prior military experience, comprising:
- a processing unit;
- a memory storage device;
- a display device coupled to the processing unit for displaying data; and
- a program module for providing instructions to the processing unit, the processing unit responsive to the instructions of the program module, operable for:
  receiving input for one or more first military service fields corresponding to military experience of a candidate profile, the input for the one or more first military service fields comprising a selection of one or more military terms from a first listing of military terms, the military terms corresponding to one of skills and experience acquired by the candidate during service in an armed force;
  receiving input for one or more second military service fields corresponding to an employer profile, the input for the one or more second military service fields comprising a selection of one or more military terms from a second listing of military terms, the first listing of military terms being identical to the second listing of military terms;
  receiving input for one or more non-military service fields of a candidate profile and for one or more non-military service fields of an employer profile;
  identifying a plurality of candidate profiles whose level of military service matches a desired level of military service of an employer profile;
  storing a candidate profile in the memory storage device if the candidate profile whose level of military service matches the desired level of military service of the employer profile;
  comparing military service fields in the candidate profile stored in the memory against military service fields in the employer profile;
  assigning weight values to military service fields of the candidate profile based on a degree of matching between the military service fields of the employer profile and the candidate profile, the assigning weight values to military service fields further comprising assigning a first weight value to a military service field of a candidate profile if a status of the military service field in a corresponding employer profile is preferred; and assigning a second weight value to a military service field of a candidate profile if a status of the military service field in a corresponding employer profile is not preferred;
  comparing non-military service fields in the employer profile against military service fields in the candidate profile;
  assigning weight values to non-military service fields of the candidate profile based on a degree of matching between the military service fields of the employer profile and the candidate profile; and
  determining a percent match of the candidate profile with respect to the matched employer profile based on the assigned weight values to the military service fields and non-military service fields in the candidate profile.

14. The computer system of claim 13, further comprising determining a maximum number of score points for the employer profile.

15. The computer system of claim 13, wherein the desired level of military service comprises time served in the military.

16. The computer system of claim 13, wherein the military service fields further comprise at least one of military rank, military branch of service, military MOS, security clearance held, certifications held, and licenses held.

17. The computer-implemented method of claim 8, wherein the non-military service fields comprise at least one of undergraduate school, undergraduate degree, undergraduate major, undergraduate GPA, undergraduate graduation year, graduate degree, diversity data, interpersonal rating, industry experience, city preferences, foreign languages spoken, job titles, geo-region preferences, salary requirements, salary bonuses desired, shift work, and travel percentage.

18. The computer system of claim 13, wherein the non-military service fields comprise at least one of undergraduate school, undergraduate degree, undergraduate major, undergraduate GPA, undergraduate graduation year, graduate degree, diversity data, interpersonal rating, industry experience, city preferences, foreign languages spoken, job titles, geo-region preferences, salary requirements, salary bonuses desired, shift work, and travel percentage.

* * * * *